United States Patent
Yeh et al.

(10) Patent No.: US 12,455,200 B2
(45) Date of Patent: Oct. 28, 2025

(54) ELECTRIC SIGNAL RECONSTRUCTION SYSTEM AND METHOD

(71) Applicant: INDUSTRIAL TECHNOLOGY RESEARCH INSTITUTE, Hsinchu (TW)

(72) Inventors: Che-Kai Yeh, Tainan (TW); Chih-Che Lin, Tainan (TW); Chao-Ta Huang, Hsinchu (TW); Shih-Ting Lin, Tainan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 313 days.

(21) Appl. No.: 18/205,258

(22) Filed: Jun. 2, 2023

(65) Prior Publication Data

US 2024/0192063 A1 Jun. 13, 2024

(30) Foreign Application Priority Data

Dec. 12, 2022 (TW) .................................. 111147598

(51) Int. Cl.
*G01L 1/16* (2006.01)

(52) U.S. Cl.
CPC ...................................... *G01L 1/16* (2013.01)

(58) Field of Classification Search
CPC ... G01L 1/16; G06F 7/50; G06F 7/523; H03F 1/34; H03M 1/12
See application file for complete search history.

(56) References Cited

U.S. PATENT DOCUMENTS

| 4,441,044 A | 4/1984 | Ruckenbauer et al. |
| 6,439,030 B2 | 8/2002 | Suzuki et al. |

(Continued)

FOREIGN PATENT DOCUMENTS

| CN | 1484814 A | 3/2004 |
| CN | 110073173 A | 7/2019 |

(Continued)

OTHER PUBLICATIONS

TW Office Action dated Feb. 1, 2024 as received in Application No. 111147598.

(Continued)

*Primary Examiner* — Octavia Hollington
(74) *Attorney, Agent, or Firm* — Maschoff Brennan

(57) ABSTRACT

An electric signal reconstruction system includes a signal generator and a computing element. The signal generator has a time constant and is configured to generate a plurality of signal value corresponding to a plurality of time points within a time period, wherein the signal values include a designated value, the time points include a designated time point, and the designated value corresponds to the designated time point. The computing element is electrically connected to the signal generator and is configured to perform operations including: performing a differential calculation or an integral calculation according to the time points and the signal values to generate a fundamental value; calculating a correction constant associated with the time constant; calculating a product of the correction constant and the fundamental value as a correction value; calculating a sum of the correction value and the designated value as a reconstruction value; and outputting the reconstruction value.

30 Claims, 14 Drawing Sheets

(56) References Cited

U.S. PATENT DOCUMENTS

| | | |
|---|---|---|
| 6,687,657 B2 | 2/2004 | Levin |
| 9,144,869 B2 | 9/2015 | Sato et al. |
| 9,206,032 B1 | 12/2015 | Kang et al. |
| 9,778,765 B2 | 10/2017 | Ishii et al. |
| 10,352,786 B2 * | 7/2019 | Kawamura ............. H03M 1/12 |
| 11,073,826 B2 | 7/2021 | Cella et al. |
| 11,221,269 B2 * | 1/2022 | Takahashi ................ G01D 5/16 |
| 11,411,161 B2 * | 8/2022 | Lin ........................... G01L 1/16 |
| 2008/0033671 A1 | 2/2008 | Bader et al. |
| 2010/0152621 A1 | 6/2010 | Janna et al. |
| 2016/0117035 A1 | 4/2016 | Watazu et al. |
| 2018/0080839 A1 | 3/2018 | Taghibakhsh |
| 2021/0018376 A1 * | 1/2021 | Lo ............................ G01J 5/22 |
| 2025/0015894 A1 * | 1/2025 | Ryu ................... H04B 10/2572 |

FOREIGN PATENT DOCUMENTS

| | | | |
|---|---|---|---|
| EP | 2 021 739 B1 | 10/2017 | |
| KR | 20140132262 A * | 11/2014 | ......... G01R 31/1254 |
| TW | 201027030 A | 7/2010 | |
| TW | 201836504 A | 10/2018 | |

OTHER PUBLICATIONS

Zhao et al., "An indirect comparison quasi-static calibration method for piezoelectric pressure sensors based on an inverse model" Mar. 23, 2020.

Volf et al., "Measurement of static forces up to 50 N using piezo ceramics PZK 850" 2021.

Li et al., "Research on piezoelectric pressure sensor for shock wave load measurement" May 13, 2020.

* cited by examiner

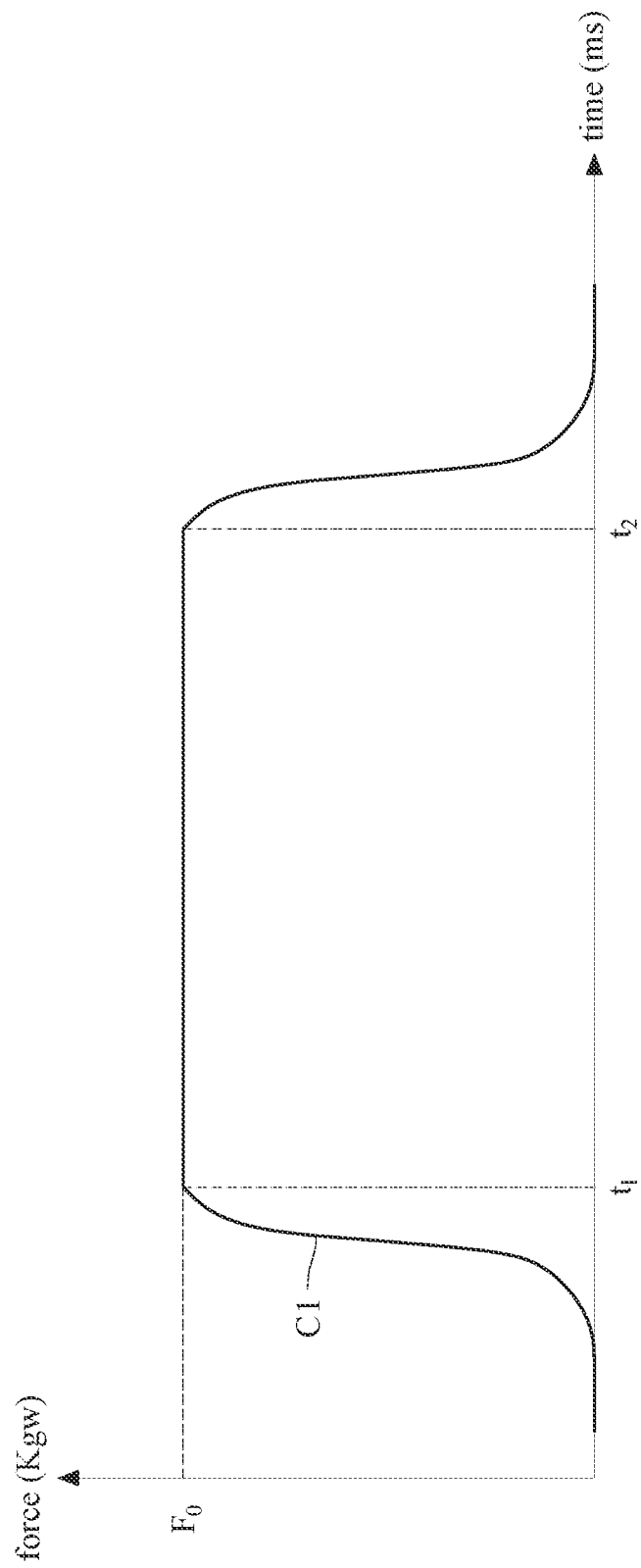

ELECTRIC SIGNAL RECONSTRUCTION SYSTEM AND METHOD

CROSS-REFERENCE TO RELATED APPLICATIONS

This non-provisional application claims priority under 35 U.S.C. § 119(a) on Patent Application No(s). 111147598 filed in Republic of China (ROC) on Dec. 12, 2022, the entire contents of which are hereby incorporated by reference.

TECHNICAL FIELD

This disclosure relates to an electric signal reconstruction system and method, especially to an electric signal reconstruction system and method adapted to signal generator such as a piezoelectric force sensor and a resistor-capacitor circuit.

BACKGROUND

Force sensors (for example, piezoelectric force sensors) can be applied to forging machine tools to monitor the processing status of the machine through force sensing. However, the current force sensor cannot instantly and correctly reconstruct the waveform of the input force. For example, the piezoresistive force sensor requires a long measurement duration, and cannot instantly reconstruct the waveform of the input force. When the force applied the piezoelectric force sensor does not increase (the force is a constant value), the waveform corresponding to the force will be in a horizontal form. However, due to the RC discharging effect of the piezoelectric element in the piezoelectric force sensor, the electrical signal (eg, voltage) output by the piezoelectric force sensor will form a decaying waveform instead of a horizontal waveform.

SUMMARY

According to one or more embodiment of this disclosure, an electric signal reconstruction system includes a signal generator and a computing element. The signal generator has a time constant and is configured to generate a plurality of signal values corresponding to a plurality of time points within a time period, wherein the plurality of signal values include a designated value, the plurality of time points include a designated time point, and the designated value corresponds to the designated time point. The computing element is electrically connected to the signal generator and is configured to perform operations including: performing a differential calculation or an integral calculation according to the plurality of time points and the plurality of signal values to generate a fundamental value; calculating a correction constant associated with the time constant; calculating a product of the correction constant and the fundamental value as a correction value; calculating a sum of the correction value and the designated value as a reconstruction value; and outputting the reconstruction value.

According to one or more embodiment of this disclosure, an electric signal reconstruction system includes a signal generator and a computing element. The signal generator has a time constant and is configured to generate a plurality of signal values corresponding to a plurality of time points within a time period, wherein the plurality of signal values include a designated value, the plurality of time points include a designated time point, and the designated value corresponds to the designated time point. The computing element is electrically connected to the signal generator and is configured to perform operations including: performing a differential calculation and an integral calculation according to the plurality of time points and the plurality of signal values to generate a fundamental value; calculating a correction constant associated with the time constant; calculating a product of the correction constant and the fundamental value as a correction value; calculating a sum of the correction value and the designated value as a reconstruction value: and outputting the reconstruction value.

According to one or more embodiment of this disclosure, an electric signal reconstruction system includes a signal generator and a computing element. The signal generator has a time constant and is configured to be triggered to generate a plurality of signal values corresponding to a plurality of time points within a time period, wherein the plurality of signal values include a designated value, the plurality of time points include a designated time point, and the designated value corresponds to the designated time point. The computing element is electrically connected to the signal generator and is configured to perform operations including: performing a differential calculation and an integral calculation according to the plurality of time points and the plurality of signal values to generate a fundamental value; calculating a correction constant associated with the time constant, calculate a product of the correction constant and the fundamental value as a correction value; calculating a sum of the correction value and the designated value as a reconstruction value, and outputting the reconstruction value.

According to one or more embodiment of this disclosure, an electric signal reconstruction system, adapted to a piezoelectric force sensor, includes: a first circuit board, a signal generator and a computing element. The signal generator includes a piezoelectric sensing element disposed on the first circuit board and configured to sense force: a reading circuit electrically connected to the piezoelectric sensing element; an analog-to-digital converter electrically connected to the reading circuit; and a filter electrically connected to the analog-to-digital converter. The signal generator has a time constant, the force triggers the signal generator to generate a plurality of signal values corresponding to a plurality of time points within a time period, wherein the plurality of signal values include a designated value, the plurality of time points include a designated time point, and the designated value corresponds to the designated time point. The computing element is electrically connected to the filter and is configured to perform operations including: performing an integral calculation according to the plurality of signal values and the plurality of time points to generate an integral value; setting a fundamental value as the integral value and setting a correction value as a reciprocal of the time constant; calculating a product of the correction constant and the fundamental value as a correction value; and calculating a sum of the correction value and the designated value as a reconstruction value and output the reconstruction value.

According to one or more embodiment of this disclosure, an electric signal reconstruction method, performed by a computing element, includes: obtaining a plurality of signal values corresponding to a plurality of time points within a time period and a time constant from a signal generator, wherein the plurality of signal values include a designated value, the plurality of time points include a designated time point, and the designated value corresponds to the designated time point; performing an integral calculation or a differential calculation according to the designated time point and the plurality of signal values to generate a fundamental value; calculating a correction constant associated with the time constant and calculating a product of the correction constant and the fundamental value as a correction value; and calculating a sum of the correction value and the designated value as a reconstruction value, and outputting the reconstruction value.

BRIEF DESCRIPTION OF THE DRAWINGS

The present disclosure will become more fully understood from the detailed description given herein below and the accompanying drawings which are given by way of illustration only and thus are not limitative of the present disclosure and wherein:

FIG. 9A illustrates a waveform of an input force input into a piezoelectric force sensor.

DETAILED DESCRIPTION

Embodiments are described in the following detailed description. For purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Numerous electric signal reconstruction system and method according to one or more embodiments of the present disclosure may be applied to a plurality of signal values (discharging-type signal value) generated by a force sensor (for example, a piezoelectric force sensor) in order to reconstruct the discharging-type signal values which are the same as or are similar to a plurality of force values (first physical quantity) originally input into the force sensor. The electric signal reconstruction system and method according to one or more embodiments of the present disclosure may also be applied to a plurality of signal values (charging-type signal value or discharging-type signal value) generated by a resistor-capacitor circuit (RC circuit with a resistor and a capacitor connected in series) in order to reconstruct the charging-type signal values or the discharging-type signal values which are the same as or are similar to a plurality of voltage values (second physical quantity) originally input into the resistor-capacitor circuit.

Figure 1:
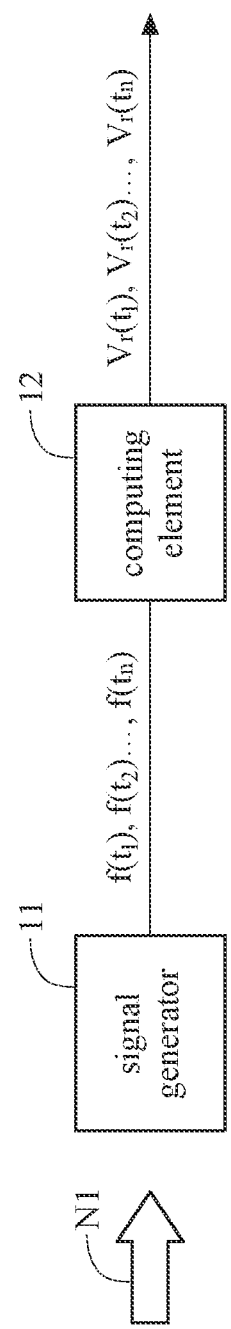
FIG. 1 is a block diagram illustrating an electric signal reconstruction system according to a first embodiment of the present disclosure.

FIG. 1 is a block diagram illustrating an electric signal reconstruction system according to a first embodiment of the present disclosure. The electric signal reconstruction system A1 includes a signal generator 11 and a computing element 12, wherein the computing element 12 is electrically connected to the signal generator 11.

As shown in FIG. 1, the signal generator 11 is, for example, the piezoelectric force sensor or the resistor-capacitor circuit (RC circuit) with a resistor and a capacitor which are connected in series. The computing element 12 is an element with computation function, such as a central processing unit (CPU), a microcontroller (MCU), a microprocessor (MPU), an application specific integrated circuit (ASIC) or an integration of a plurality of microprocessors, the present disclosure is not limited thereto.

Note that the signal generator 11 having a time constant ($\tau$) may be configured to generate a plurality of signal values within a time period. For example, when a waveform of force N1 (first physical quantity) consisting of a plurality of force values is continuously applied to the signal generator 11 (for example, the piezoelectric force sensor) within the time period, the signal generator 11 may generate a plurality of signal values ($f(t_1), f(t_2) \ldots f(t_{n-1})$ and $f(t_n)$). The signal values ($f(t_1), f(t_2) \ldots f(t_{n-1})$ and $f(t_n)$) correspond to a plurality of time points ($t_1, t_2, t_3 \ldots, t_n$) within the time period. The signal values include a designated value ($f(t_n)$), and the time points include a designated time point ($t_n$), wherein the designated value ($f(t_n)$) corresponds to the designated time point ($t_n$). The signal values ($f(t_1), f(t_2) \ldots f(t_{n-1})$ and $f(t_n)$) represent a plurality of sensing values corresponding to the force of the time points ($t_1, t_2, t_3 \ldots, t_n$). In an ideal situation, after force consisting of a plurality of force values is applied to the signal generator 11, the signal generator 11 generates a plurality of expected signal values having a linear relationship with the force values. Using the expected signal values and a table of voltage values versus force values can look up a plurality of force values which are similar to or are the same as the force N1. By inputting the expected signal values into a mathematical function which relates voltage values to force values, a plurality of force values which are similar to or are the same as the force N1 can be obtained. However, due to the effect of the time constant of the piezoelectric force sensor, said signal values decay as time passes. Therefore, the signal values are not similar to nor the same as the expected signal values. To correctly obtain a plurality of force values of the force N1 applied on the signal generator 11 within the time period, the present disclosure proposes that the time constant of the signal generator 11 is provided to the computing element 12, and then the computing element 12 converts the signal values into a plurality of the reconstruction values ($V_r(t_1)$, $V_r(t_2)$ ..., $V_r(t_n)$) which are similar to or the same as the expected signal values.

Calculations of differentials and/or calculations of integrals can be performed by the computing element 12 to generate a fundamental value. According to the time constant, the fundamental value and the designated value, the computing element 12 may obtain and output the reconstruction value.

Figure 2:
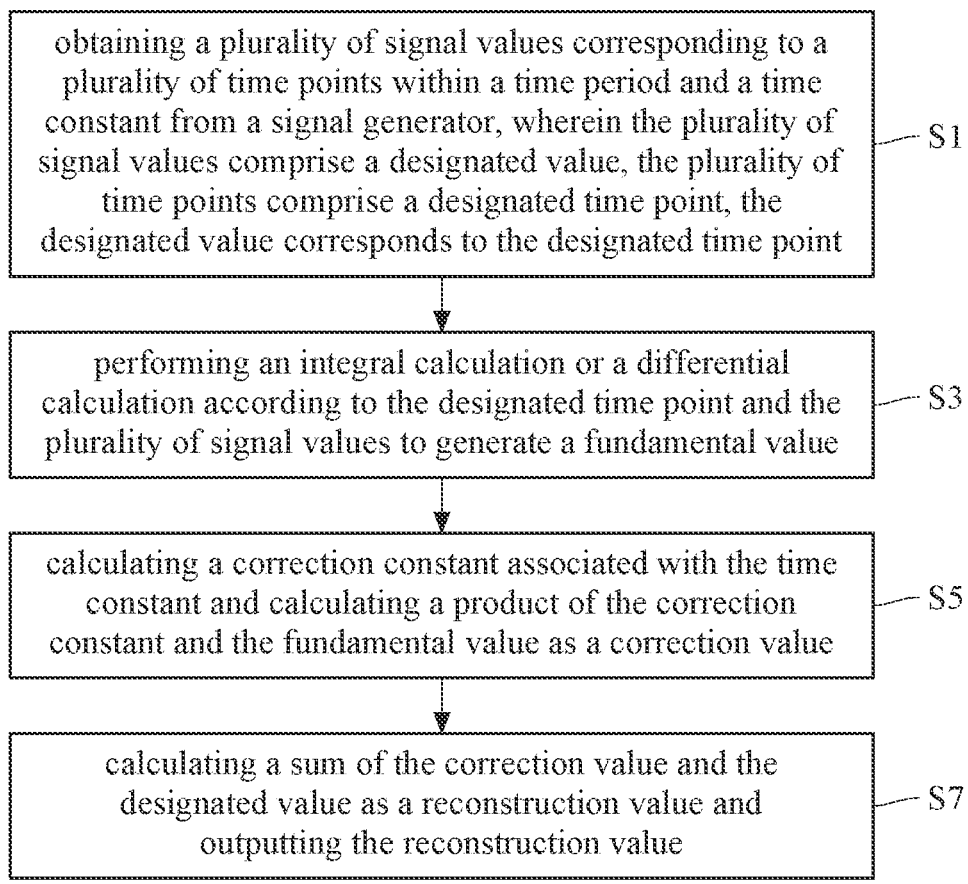
FIG. 2 is a flowchart illustrating an electric signal reconstruction method according to an embodiment of the present disclosure.

Referring to FIG. 1 and FIG. 2 that provide further explanation of how the computing element 12 calculates and outputs the reconstruction value, a flowchart in FIG. 2 illustrates an electric signal reconstruction method according to an embodiment of the present disclosure. The electric signal reconstruction method shown in FIG. 2 may be performed by the computing element 12 of FIG. 1.

Each step in FIG. 2 are described in following details. FIG. 2 illustrates the electric signal reconstruction method, wherein the electric signal reconstruction method includes step S1, step S3, step S5 and step S7. The following explains each step in detail.

As shown in step S1, the computing element 12 obtains the time constant ($\tau$) and the signal values ($f(t_1)$, $f(t_2)$, $f(t_3)$ ..., $f(t_n)$) corresponding to the time points ($t_1$, $t_2$, $t_3$ ..., $t_n$) from the signal generator 11, wherein the signal values include a designated value ($f(t_n)$), the time points include a designated time point ($t_n$), and the designated value ($f(t_n)$) corresponds to the designated time point ($t_n$). Specifically, in step S1, the signal values obtained by the computing element 12 may be a plurality of signal values which are generated when the signal generator 11 is triggered by the force N1, wherein the signal generator 11 includes a piezoelectric sensing element. The signal generator 11 may also include the RC circuit, wherein the signal values obtained by the computing element 12 in step S1 may be a plurality of signal values which are generated when the RC circuit is discharging or charging.

The computing element 12 in step S3 performs the differential calculation or the integral calculation to generate the fundamental value according to the designated time point and the signal values. In step S5, the computing element 12 calculates a correction constant associated with the time constant and calculates a product of the correction constant and the fundamental value as a correction value. Specifically, in steps S3 and S5, according to the designated time point and the signal values, the computing element 12 performs the differential calculation to generate a differential value as the fundamental value or performs the integral calculation to generate an integral value as the fundamental value. The computing element 12 then calculates the correction constant. The computing element 12 uses the product of the correction constant and the fundamental value as the correction value, wherein the detail of calculating the fundamental value and the correction value are described below with reference to FIG. 3. Moreover, if the signal values are the discharging-type signal values, the computing element 12 performs the integral calculation according to the time points and the signal values to generate the integral value as the fundamental value ($C(t_n)$) and calculates a reciprocal $$\left(\frac{1}{\tau}\right)$$

of the time constant ($\tau$) as the correction constant ($\kappa$). If the signal values are the charging-type signal values, the computing element 12 performs the differential calculation according to the time points and the signal values to generate the differential value as the fundamental value ($C(t_n)$) and sets the time constant ($\tau$) as the correction constant ($\kappa$).

Expressed in step S7, the computing element 12 calculates a sum of the correction value ($V_c(t_n)$) and the designated value ($f(t_n)$) as the reconstruction value ($V_r(t_n)$) and outputs the reconstruction value. Specifically, the computing element 12 uses the sum of the correction value and the designated value as the reconstruction value, wherein the reconstruction value is a value reconstructed from the signal values by the computing element 12, wherein the signal values are generated by the signal generator 11. A numerical value of the reconstruction value may be the same as or similar to the expected signal value, and a waveform formed from the reconstruction value may be the same as or similar to a waveform formed from the expected signal values. By using the reconstruction value, a plurality of physical quantities (for example, force or voltage) initially applied to the signal generator 11 may be obtained. For example, when the signal generator 11 is the piezoelectric sensing element, the reconstruction value and the table of voltage values versus force values may be used to look up a plurality of force values which are similar to or are the same as the force N1. Or the reconstruction value may be input into the mathematical function which relates the voltage values to the force values, thereby obtaining a plurality of force values which are the same as or similar to the force N1. In addition, the waveform constructed by the plurality of force values is also the same as or similar to the waveform constructed by the force N1.

Figure 3:
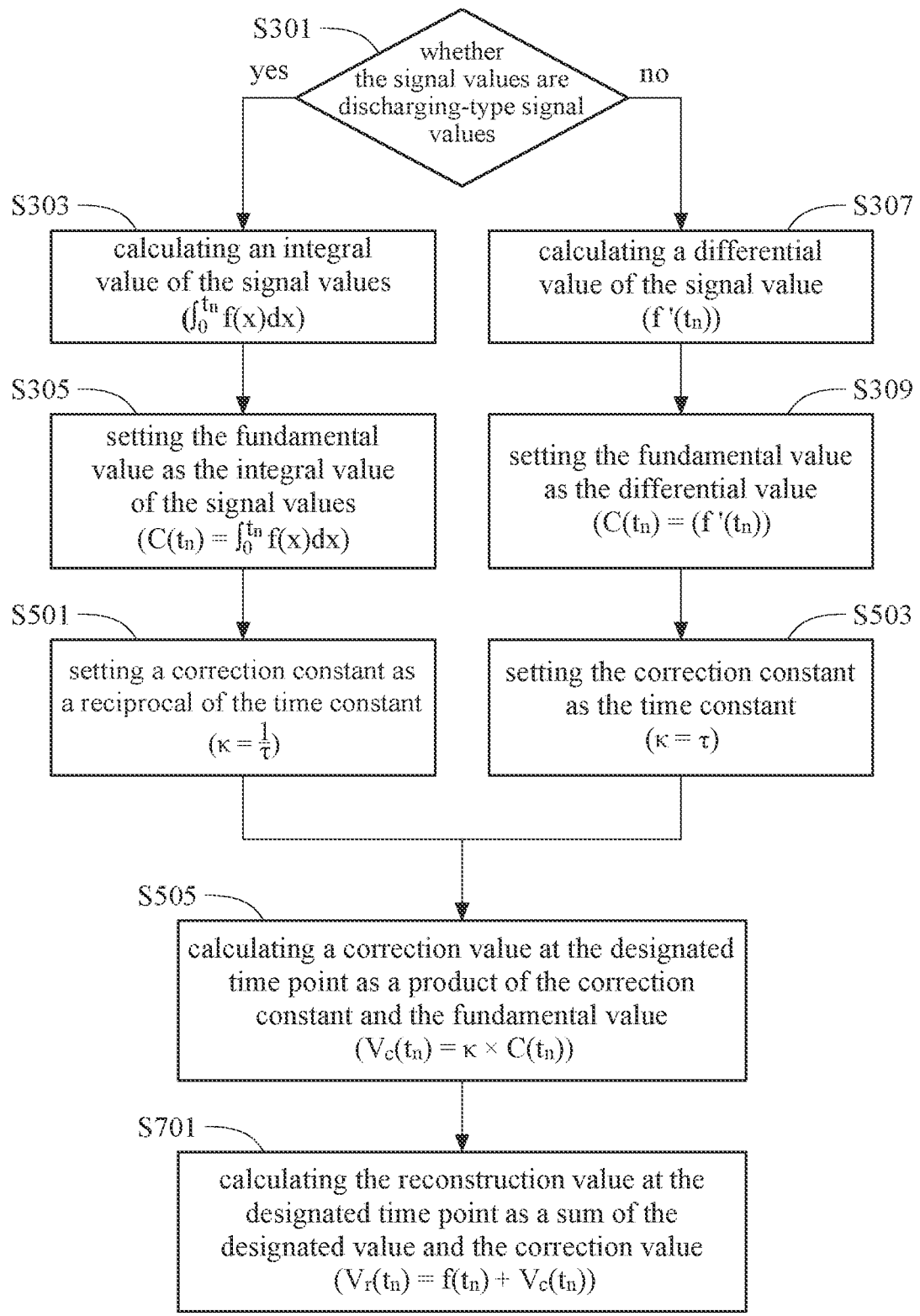
FIG. 3 is a flowchart illustrating an electric signal reconstruction method according to another embodiment of the present disclosure.

Please refer to FIG. 1 and FIG. 3, wherein FIG. 3 is a flowchart illustrating an electric signal reconstruction method according to another embodiment of the present disclosure. The electric signal reconstruction method shown in FIG. 3 may be performed by the computing element 12 of FIG. 1.

In FIG. 3, the electric signal reconstruction method may include step S301, steps S303, step S305, steps S307, Step S309, step S501, step S503, step S505 and step S701. According to the determination result of step S301, the computing element 12 performs steps S303, S305 and S501, or performs steps S307, S309 and S503. It should be noted that, step S3 of FIG. 2 may include steps S301, S303, S305, S307 and S309 of FIG. 3. Furthermore, step S5 of FIG. 2 may include steps S501, S503 and S505 of FIG. 3 and step S7 of FIG. 2 may include step S701 of FIG. 3.

Given the details in step S301, the computing element 12 determines whether a plurality of signal values ($f(t_1)$, $f(t_2)$, $f(t_3)$ ..., $f(t_n)$) are the discharging-type signal values or the charging-type signal values. Specifically, in step S301, the signal values are signal values that have been digitalized, and the computing element 12 may perform a determination calculation according to the time points ($t_1$, $t_2$, $t_3$ ..., $t_n$) and the signal values ($f(t_1)$, $f(t_2)$, $f(t_3)$ ..., $f(t_n)$) to determine whether the signal values belongs to the discharging-type signal values or the charging-type signal values. For example, if the type of the signal generator 11 is the resistor-capacitor circuit (RC circuit) formed by a resistor and a capacitor which are connected in series, the signal values may include a plurality of discharging-type signal values or a plurality of charging-type signal values when the resistor-capacitor circuit generates the signal values. The computing element 12 may determine that the signal values are the charging-type signal values when the signal values are increasing values. The computing element 12 may determine that the signal values are the discharging-type signal values when the signal values are decreasing values. However, if a type of the signal generator 11 is pre-stored in the computing element 12, the computing element 12 may also determine whether the signal values belong the discharging-type signal or the charging-type signal values through the type of the signal generator 11 pre-stored in the computing element 12. For example, if the type of the signal generator 11 is a piezoelectric sensing element and the computing element 12 has stored the type of the signal generator 11, then the computing element 12 may determine that the signal values are the discharging-type signal values.

For the convenience of description, the following assumes that the time constant is $\tau$ and assumes that the time points of the time period are $t_1$ to $t_n$, then the signal values corresponding to this time period may include ($f(t_1)$, $f(t_2)$ ... $f(t_{n-1})$ and $f(t_n)$. The designated time point may be defined as $t_n$, and the designated value may be defined as $f(t_n)$.

If the determination result of step S301 made by the computing element 12 is "yes", the computing element 12 performs step S303: using the signal values ($f(t_1)$, $f(t_2)$, $f(t_3)$ ..., $f(t_n)$) and the corresponding time points ($t_1, t_2, t_3 \ldots, t_n$) to calculate the integral value. Specifically, if in step S301, the computing element 12 determines that the signal values are the discharging-type signal values, then in step S303, the integral value calculated by the computing element 12 may be: $\int_0^{t_n} f(x)dx$. The computing element 12 may use various numerical integration methods (such as, midpoint rule, trapezoidal rule etc.) to obtain the integral value $\int_0^{t_n} f(x)dx$.

Shown in step S305, the computing element 12 sets the fundamental value $C(t_n)$ as the integral value of the signal values. Specifically, the computing element 12 may set the fundamental value $C(t_n)$ corresponding to the designated time point $t_n$ through equation (1) below.

$$C(t_n)=\int_0^{t_n} f(x)dx \tag{1}$$

Hence, in step S501, the computing element 12 sets the correction constant as the reciprocal of the time constant. Specifically, in step S501, the computing element 12 may set the correction constant k according to the time constant $\tau$ through equation (2) below. That is, the correction constant k is the reciprocal of the time constant $\tau$.

$$k = \frac{1}{\tau} \tag{2}$$

The computing element 12 in step S505 calculates the product of the correction constant and the fundamental value, and uses the product as the correction value at the designated time point $t_n$. Specifically, in step S505, the computing element 12 may calculate the correction value $V_c(t_n)$ at the designated time point $t_n$ through equation (3) below.

$$V_c(t_n) = \frac{1}{\tau} \times \int_0^{t_n} f(x)dx \tag{3}$$

Herein, at the designated time point $t_n$, the computing element 12 calculates the sum of the designated value and the correction value and uses the sum as the reconstruction value in step S701. Specifically, in step S701, the computing element 12 may calculate the reconstruction value $V_r(t_n)$ corresponding to the discharging-type signal at the designated time point $t_n$ through equation (4) below.

$$V_r(t_n) = f(t_n) + V_c(t_n) = f(t_n) + \frac{1}{\tau} \times \int_0^{t_n} f(x)dx \tag{4}$$

As long as the determination result of step S301 made by the computing element 12 is "no", the computing element 12 performs step S307: calculating the differential value of the signal value (the designated value $f(t_n)$) at the designated time point $t_n$. Specifically, if in step S301, the computing element 12 determines that the signal values are the charging-type signal values, then in step S307, the computing element 12 calculates the differential value of the designated value $f(t_n)$ at the designated time point $t_n$ as: $f'(t_n)$. The computing element 12 may use various numerical differentiation methods (such as, finite difference method) to obtain the differential value $f'(t_n)$.

The computing element 12 in step S309 sets the fundamental value $C(t_n)$ as the differential value $f'(t_n)$ of the designated value $f(t_n)$. Specifically, in step S309, the computing element 12 may set the fundamental value $C(t_n)$ corresponding to the designated time point $t_n$ through equation (5) below.

$$C(t_n)=f'(t_n) \tag{5}$$

In step S503, the computing element 12 sets the correction constant as the time constant. Specifically, in step S503, the computing element 12 may set the correction constant k according to the time constant $\tau$ through equation (6) below. That is, the correction constant k is the time constant $\tau$.

$$k=\tau \tag{6}$$

Shown in step S505, the computing element 12 may calculate the correction value $V_c$ at the designated time point $t_n$ through equation (7) below.

$$V_c(t_n)=\tau \times f'(t_n) \tag{7}$$

Likewise, in step S701, the computing element 12 may calculate the reconstruction value $V_r$ of the charging-type signal at the designated time point $t_n$ through equation (8) below.

$$V_r(t_n)=f(t_n)+V_c(t_n)=f(t_n)+\tau \times f'(t_n) \tag{8}$$

Figure 4:
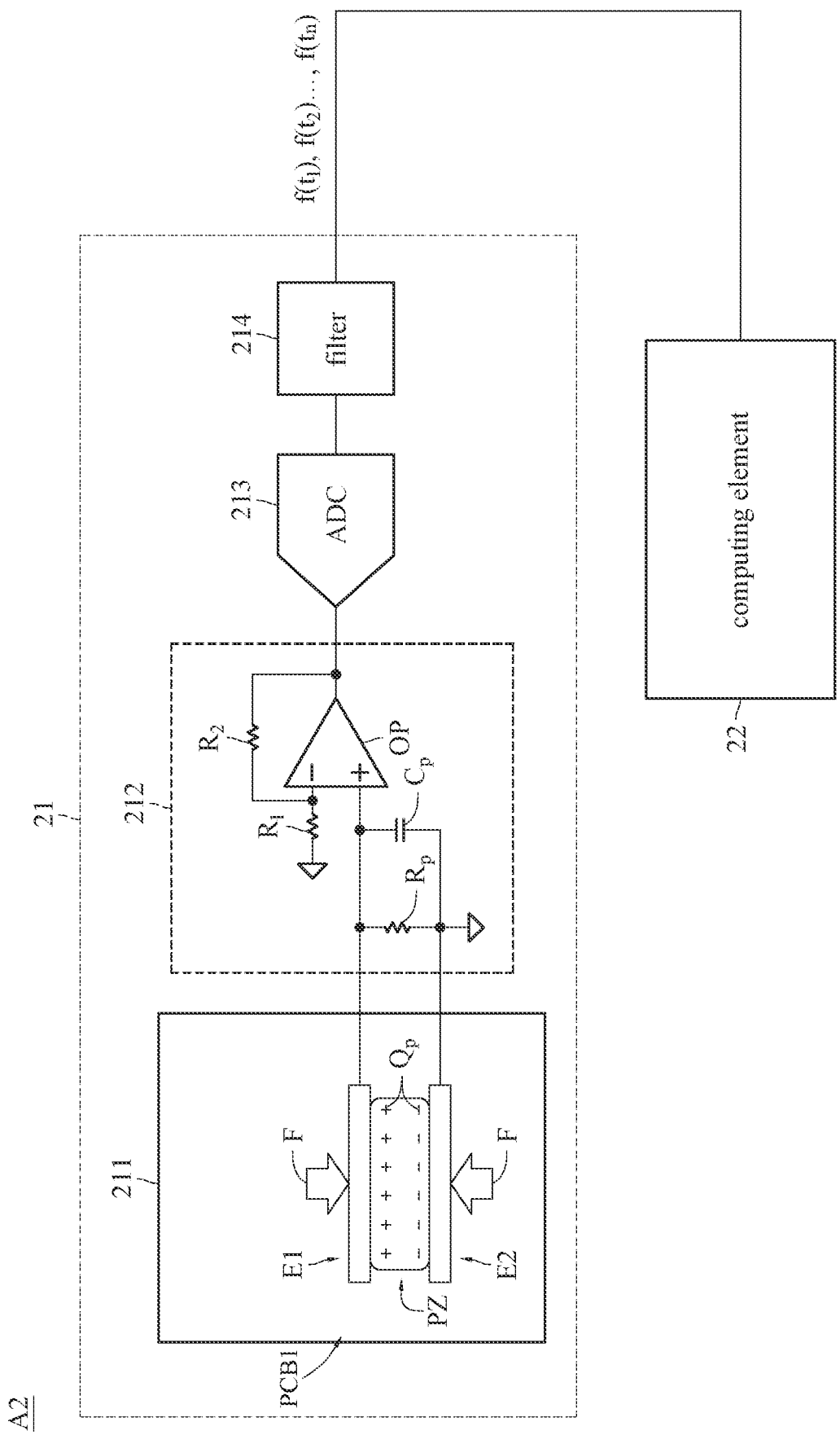
FIG. 4 is a schematic diagram illustrating an electric signal reconstruction system according to a second embodiment of the present disclosure.

Observing FIG. 4. FIG. 4 is a schematic diagram illustrating an electric signal reconstruction system according to a second embodiment of the present disclosure. The electric signal reconstruction system A2 according to the second embodiment of the present disclosure includes the signal generator 21 and the computing element 22 electrically connected to the signal generator 21, wherein the electric signal reconstruction system A2 is preferably adapted to the piezoelectric force sensor. The computing element 22 may be a central processing unit or a microprocessor.

Viewing the signal generator 21 in FIG. 4, it has the time constant and is triggered to generate a plurality of signal values. For example, when sensing a force, the signal generator 21 may be triggered to generate a plurality of signal values.

Exhibited in FIG. 4, the signal generator 21 includes a piezoelectric sensing element 211, a reading circuit 212, an analog-to-digital converter (ADC) 213, a filter 214 and a first circuit board PCB1, wherein the first circuit board PCB1 may include a printed circuit board, a substrate or an IC substrate. The piezoelectric sensing element 211 is disposed on the first circuit board PCB1. The reading circuit 212 is electrically connected to the piezoelectric sensing element 211 and the ADC 213. The ADC 213 is further electrically connected to the filter 214.

Disclosed in FIG. 4, the piezoelectric sensing element 211 may include a first electrode E1, a second electrode E2 and a piezoelectric element PZ, wherein the piezoelectric element PZ is, for example, made of quartz. When the piezoelectric sensing element 211 senses the force N1, the piezoelectric element PZ generates a charge $Q_p$ (or a voltage difference V between the first electrode E1 and the second electrode E2) that is positively correlated with the magnitudes of force N1 and triggers the signal generator 21 to generate the signal values.

Both a parallel-connected resistor $R_p$ and a capacitor $C_p$, as well as a first resistor $R_1$, a second resistor $R_2$ and an operational amplifier OP are included in the reading circuit 212. The first resistor $R_1$, the second resistor $R_2$ and the operational amplifier OP form an inverting closed loop amplifier. The parallel-connected resistor $R_p$ and the capacitor $C_p$ are connected to a non-inverting input terminal of the operational amplifier OP, and two terminals of the parallel-connected resistor $R_p$ and the capacitor $C_p$ are connected to the first electrode E1 and the second electrode E2, respectively, to read the charge $Q_p$ (or the voltage difference V between the first electrode E1 and the second electrode E2). Therefore, the reading circuit 212 may output an analog signal corresponding to the charge $Q_p$.

Yielding to the analog signal from the reading circuit 212, the ADC 213 performs an analog-to-digital conversion procedure to convert an original electric signal (analog signal) into a digital signal and outputs the digital signal. The filter 214 receives the digital signal from the ADC 213 and performs a filtering procedure on the digital signal to filter noise, out thereby generating the signal values ($f(t_1)$, $f(t_2)$, $f(t_3)$ . . . , $f(t_n)$), wherein the signal values correspond to the time points ($t_1$, $t_2$, $t_3$ . . . , $t_n$), respectively.

Connecting to an output terminal of the filter 214, the computing element 22 is configured to perform the integral calculation according to the time points ($t_1$, $t_2$, $t_3$ . . . , $t_n$) and the signal values ($f(t_1)$, $f(t_2)$, $f(t_3)$ . . . , $f(t_n)$) to generate an integral value. The computing element 22 sets the integral value as the fundamental value and sets the reciprocal of the time constant as the correction constant. Then, the computing element 22 calculates the product of the correction constant and the fundamental value as the correction value, calculates the sum of the correction value and the designated value as the reconstruction value and outputs the reconstruction value. In short, the computing element 22 may perform steps S1, S3, S5 and S7 of FIG. 2 described above and/or steps S301, S303, S305, S501, S505 and S701 of FIG. 3 described above.

The structures and elements in the piezoelectric sensing element 211 and the reading circuit 212 shown in FIG. 4 are merely examples, the present disclosure does not limit the structures and elements in the piezoelectric sensing element 211 and the reading circuit 212.

Additionally, in the embodiment of FIG. 4, the reading circuit 212 along with the ADC 213 and the filter 214 may be integrated in the same application-specific integrated circuit chip (ASIC chip). Alternatively, the piezoelectric sensing element 211 and the reading circuit 212 may be disposed on the same first circuit board PCB1, and the ADC 213 and the filter 214 may be disposed on a second circuit board PCB2, wherein the first circuit board PCB and the second circuit board PCB2 may include a printed circuit board, a substrate or an IC substrate.

Figure 5:
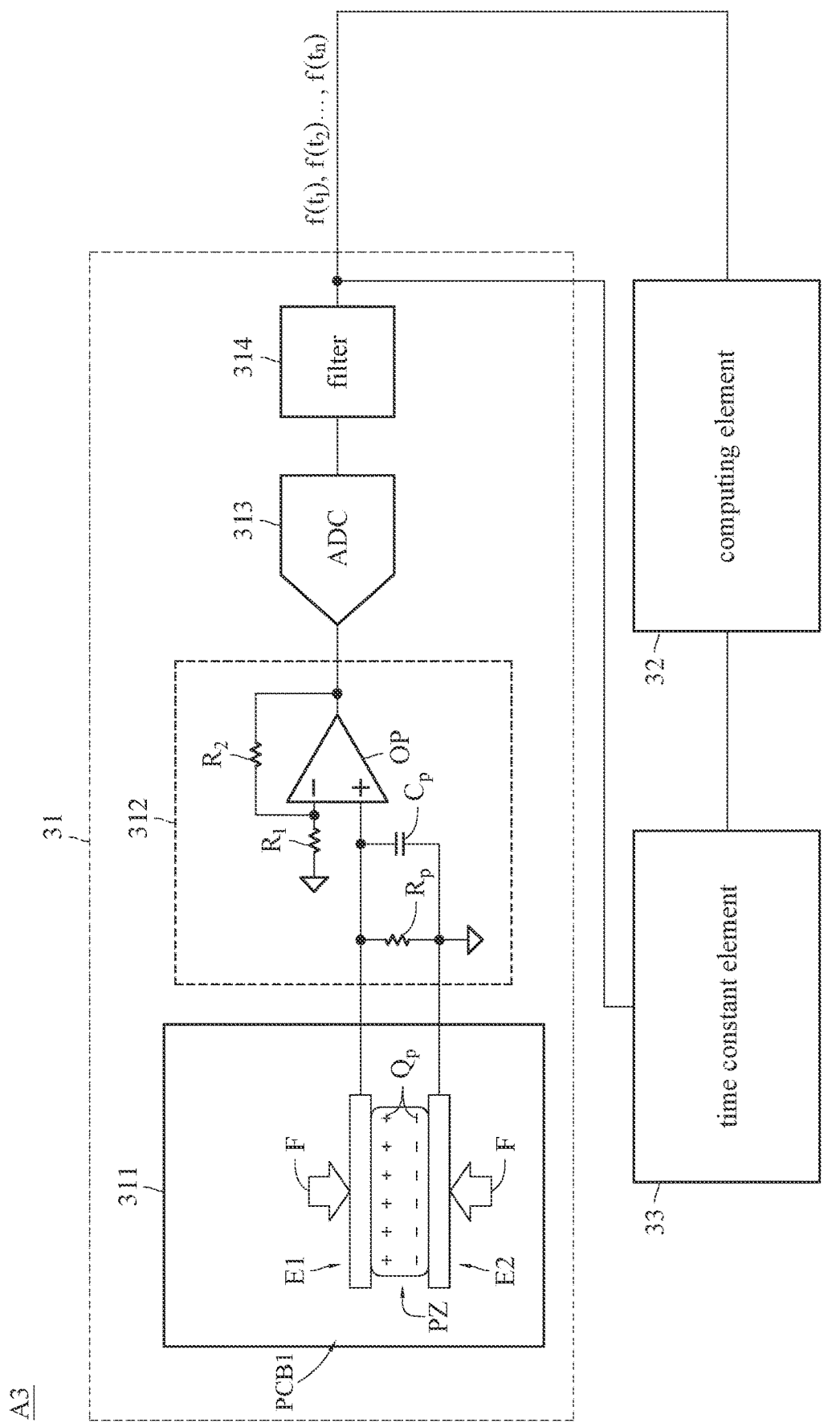
FIG. 5 is a schematic diagram illustrating an electric signal reconstruction system according to a third embodiment of the present disclosure.

Notably, in FIG. 5, there is a schematic diagram illustrating an electric signal reconstruction system according to a third embodiment of the present disclosure. The electric signal reconstruction system A3 according to the third embodiment of the present disclosure includes the signal generator 31, the computing element 32 and a time constant element 33, wherein the signal generator 31 is electrically connected to the computing element 32 and the time constant element 33, and the computing element 32 is electrically connected to the time constant element 33. The signal generator 31 of the third embodiment may be the same as the signal generator 21 of the second embodiment, the computing element 32 of the third embodiment may be the same as the computing element 12 of the first embodiment and/or the computing element 22 of the second embodiment. Therefore, the following does not repeat the details of the signal generator 31 and the computing element 32 of the third embodiment.

Despite sharing similarities with the electric signal reconstruction system A1 of the first embodiment the and the electric signal reconstruction system A2 of the second embodiments, the electric signal reconstruction system A3 of the third embodiment further includes a time constant element.

Yet, the time constant element 33 shown in FIG. 5 is electrically connected to the computing element 32 and the signal generator 31 wherein the time constant element 33 is preferably electrically connected to the filter 314 of the signal generator 31. The time constant element 33 may measure the time constant of the signal generator 31 according to a measuring procedure. Then, the time constant element 33 outputs the time constant to the computing element 32. The computing element 32 applies the time constant to perform steps S1, S3, S5 and S7 of FIG. 2 and/or steps S301, S303, S305, S501, S505 and S701 of FIG. 3 as described above. The measuring procedure of the time constant element 33 measuring the time constant are described in the following detail descriptions.

Just as the time constant element 33 triggers the signal generator 31 to generate a plurality of electric signals. Then, the reading circuit 312 reads the charge generated by the piezoelectric sensing element 311, the ADC 313 converts the analog signal corresponding to the charge into a digital signal and the filter 314 filters the digital signal. The filtered signals are digital signals and the signal values may be shown as $f(t_1)$, $f(t_2)$, $f(t_3)$ . . . , $f(t_n)$. The time constant element 33 finds a maximum signal value ($f_0$) from the signal values ($f(t_1)$, $f(t_2)$, $f(t_3)$ . . . , $f(t_n)$) and a time point ($t_i$) corresponding to the maximum signal value ($f_0$). The time constant element 33 then finds a time point ($t_{i+1}$) corresponding to half of the maximum signal value ($f_0$) (i.e. 0.5 of the maximum signal value ($0.5f_0$)). Then, the time constant element 33 calculates the time required for half-life ($T_{1/2}$). The half-life ($T_{1/2}$) can be calculated by subtracting the time point corresponding to the maximum signal value from the time point corresponding to 0.5 of the maximum signal value ($T_{1/2}=t_{i+1}-t_i$). The time constant element may calculate the time constant based on the half-life $$\left(\tau = \frac{T_{1/2}}{\ln 2}\right).$$

The above described method of calculating the time constant may also be performed by the computing element 32.

For the electric signal reconstruction system A3, the time constant of the signal generator 31 is a function of a resistance value and a capacitance value. Therefore, when the resistance value and the capacitance value of the signal generator 31 is changed, the time constant also is changed. At this point, if the updated time constant can not be obtained instantly, the computing element 32 may not be able to calculate the correct reconstruction value instantly. In addition, the resistance value and the capacitance value of the signal generator 31 may be change due to the aging of the signal generator 31 or due to different environmental conditions (for example, temperature and humidity).

As the time constant element 33 triggers the signal generator 31 to generate a plurality of signal values, the computing element 32 may obtain the updated time constant. Accordingly, even if the signal generator 31 often operates under different severe environmental conditions, the computing element 32 may still calculate the correct reconstruction value.

Notably, as described above, the piezoelectric sensing element 311 of the signal generator 31 may be disposed on the first circuit board PCB1, and the reading circuit 312 along with the ADC 313 and the filter 314 may be integrated in the same application-specific integrated circuit chip (ASIC chip). Alternatively, the piezoelectric sensing element 311 and the reading circuit 312 may be disposed on the same first circuit board PCB1, and the ADC 313 and the filter 314 are disposed on the second circuit board (the second circuit board PCB2 as shown in FIG. 6), wherein the first circuit board PCB1 and the second circuit board may include a printed circuit board, a substrate or an IC substrate respectively.

Figure 6:
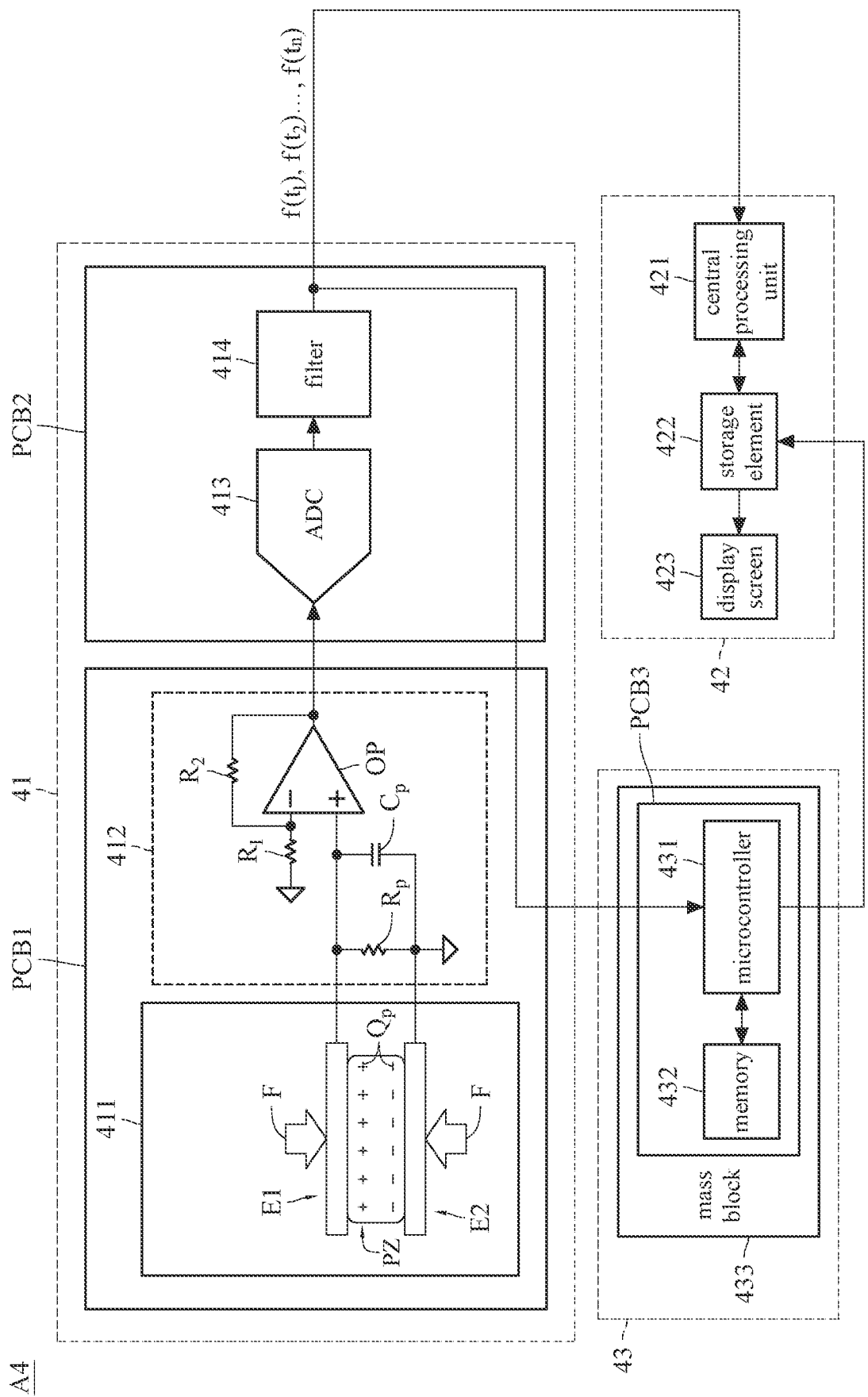
FIG. 6 is a schematic diagram illustrating an electric signal reconstruction system according to a fourth embodiment of the present disclosure.

Please refer to FIG. 6, wherein FIG. 6 is a schematic diagram illustrating an electric signal reconstruction system according to a fourth embodiment of the present disclosure. The electric signal reconstruction system A4 according to the fourth embodiment of the present disclosure includes the signal generator 41, the computing element 42 and the time constant element 43. The signal generator 41 is electrically connected to the computing element 42 and the time constant element 43. The computing element 42 is electrically connected to the time constant element 43. The piezoelectric sensing element 411 and the reading circuit 412 of the signal generator 41 are disposed on the first circuit board PCB1, wherein the first circuit board PCB1 may include a printed circuit board, a substrate or an IC substrate. The ADC 413 and the filter 414 are disposed on the second circuit board PCB2, wherein the second circuit board PCB2 may include a printed circuit board, a substrate or an IC substrate. A microcontroller 431 and memory 432 may be disposed on a mass block 433 through a third circuit board PCB3, wherein the third circuit board PCB3 may include a printed circuit board, a substrate or an IC substrate. Alternatively, in another embodiment, the microcontroller 431 and the memory 432 may be directly disposed on the third circuit board PCB3. The piezoelectric sensing element 411 may be disposed on the first circuit board PCB1, and the reading circuit 412, the ADC 413 and the filter 414 are disposed on the second circuit board PCB2.

In the fourth embodiment, the piezoelectric sensing element 411, the reading circuit 412, the ADC 413 and the filter 414 of the signal generator 41 may be the same as the piezoelectric sensing element 211/311, the reading circuit 212/312, the ADC 213/313 and the filter 214/314 of the second embodiment and/or the third embodiment, the details of the signal generator 41 of the fourth embodiment are not repeated herein.

Generally, the computing element 42 may include a central processing unit 421, a storage element 422 and a display screen 423, wherein the central processing unit 421 is electrically connected to or in communication connection with the storage element 422, and the storage element 422 is electrically connected to or in communication connection with the display screen 423. Said "in communication connection with" indicates a connection where signal may be transmitted wirelessly, such as through Bluetooth, Wi-Fi, radio frequency identification (RFID) or near field communication (NFC) etc. The central processing unit 421 may be a processor in an industrial computer, a processor in a personal computer or a processor in a tablet. The storage element 422 may be a volatile memory and is preferably a non-volatile memory (NVM), such as a read-only memory (ROM), an electrically-erasable programmable read-only memory (EEPROM) or a flash memory.

For the present embodiment, the time constant element 43 may include the microcontroller 431, the memory 432 and the mass block 433, wherein the microcontroller 431 and the memory 432 are electrically connected to each other. The microcontroller 431 is electrically connected to the storage element 422 of the computing element 42. The memory 432 may be a volatile memory and is preferably a non-volatile memory (NVM), such as a read-only memory (ROM), an electrically-erasable programmable read-only memory (EEPROM) or a flash memory. The mass block 433 is configured to trigger the signal generator 41 to generate a plurality of electric signals by the weight of the mass block 433 and generate the signal values $f(t_1)$, $f(t_2)$, $f(t_3)$ . . . , $f(t_n)$ corresponding to the time points ($t_1$, $t_2$, $t_3$ . . . , $t_n$) through the reading circuit 412, the ADC 413 and the filter 414. After calculating the time constant ($\tau$) according to the signal values, the time points and the measuring procedure as described above, the microcontroller 431 may store the time constant into the memory 432 and output the time constant to the computing element 42 (for example, outputting the time constant to the central processing unit 421 or the storage element 422).

In FIG. 6, after the signal generator 41 outputs the signal values and the time constant element 43 outputs the time constant ($\tau$), the central processing unit 421 of the computing element 42 may perform steps S1, S3, S5 and S7 of FIG. 2 and/or steps S301, S303, S305, S501, S505 and S701 of FIG. 3 as described above to generate the reconstruction value ($V_r(t_n)$). After generating the reconstruction value, the central processing unit 421 may output the reconstruction value to the storage element 422 which may store the reconstruction value. The display screen 423 may read the reconstruction value from the storage element 422 and display the reconstruction value.

Substantially, the structures and elements in the computing element 42 and the time constant element 43 shown in FIG. 6 are merely examples. For example, the computing element 42 may only include the central processing unit 421, or may only include the central processing unit 421 and the storage element 422 or the display screen 423. The time constant element 43 may include the microcontroller 431 and the mass block 433, the present disclosure does not limit the structures and elements of the computing element 42 and the time constant element 43.

Herein, in the embodiment (the embodiment adapted for the piezoelectric force sensor) with the signal generator 41 including the piezoelectric sensing element 411, the method of triggering the signal generator 41 to generate the signal values may include: applying gradually increasing force to the piezoelectric sensing element 411 in order to generate gradually increasing charge $Q_p$. At this point, the signal values generated by the signal generator 41 are the gradually increasing signal values. When the applied force on the piezoelectric sensing element 411 stops increasing, the signal generator 41 generates the decreasing signal values due to a discharge effect of the reading circuit 412. In the measuring procedure of obtaining the time constant described above, the microcontroller 431 obtains the time constant ($\tau$) according to the increasing signal values, the decreasing signal values and the time points. In addition, in the present embodiment, in the measuring procedure of obtaining the time constant described above, the method of applying force to the piezoelectric sensing element 411 may include: directly placing the mass block 433 on the piezoelectric sensing element 411 to trigger the signal generator 41 to generate the signal values by the weight of the mass block 433, or applying an external force with a square waveform to the piezoelectric sensing element 411 to trigger the signal generator 41 to generate the signal values. In the present embodiment, the time constant element 43 having the mass block 433 may be designed as a split element and may not be integrated with the signal generator 41 and the computing element 42 in a device. For example, the signal generator 41 and the computing element 42 may be disposed on a machine tool and the time constant element 43 may be carried by maintenance personnel. Therefore, the maintenance personnel may easily update the time constant of the signal generator 41 periodically, so that the computing element 42 may calculate the correct reconstruction value for a long time.

Figure 7:
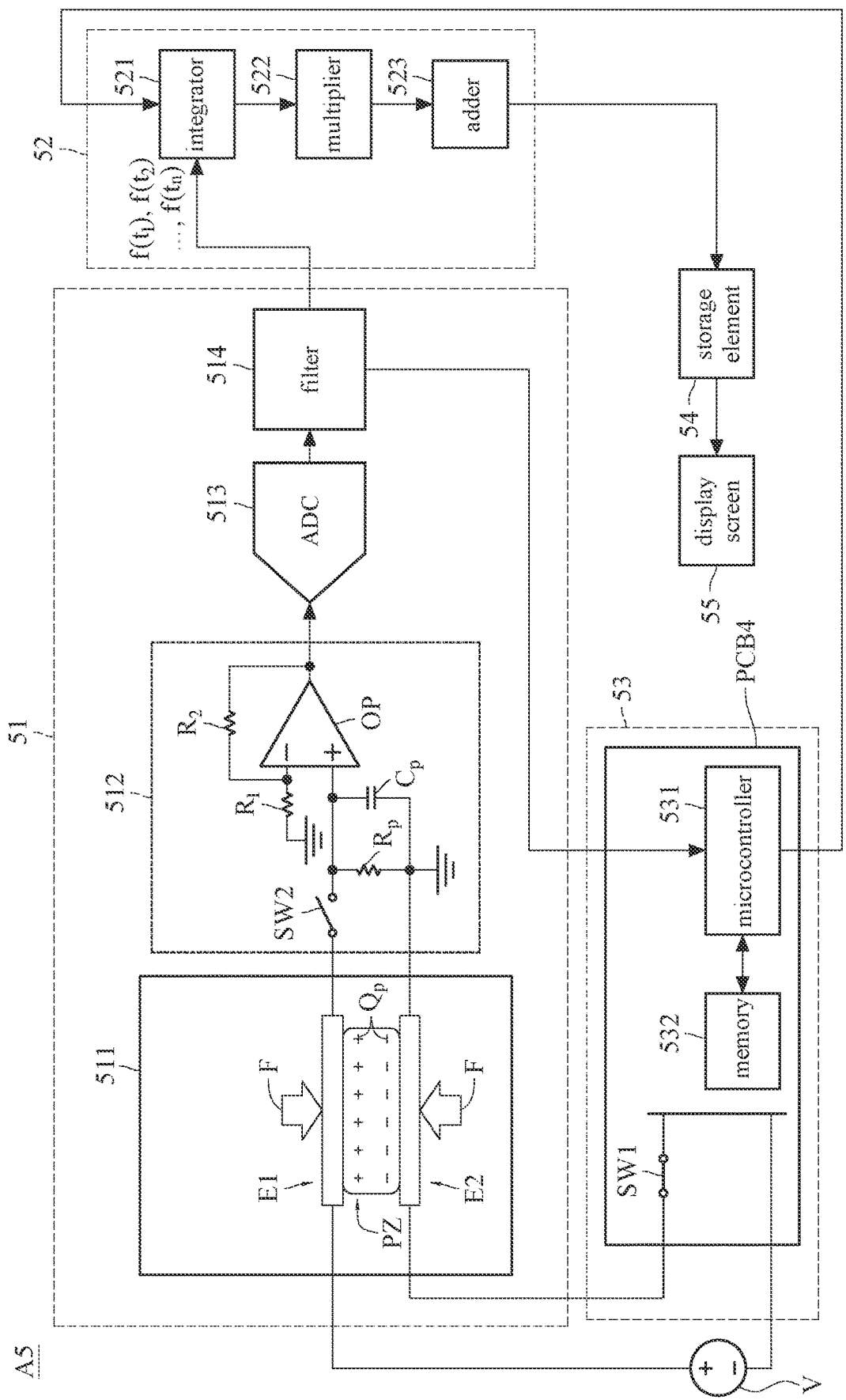
FIG. 7 is a schematic diagram illustrating an electric signal reconstruction system according to a fifth embodiment of the present disclosure.

As shown in FIG. 7, wherein FIG. 7 is a schematic diagram illustrating an electric signal reconstruction system according to a fifth embodiment of the present disclosure. The electric signal reconstruction system A5 according to the fifth embodiment of the present disclosure includes the signal generator 51, the computing element 52 and the time constant element 53, wherein the signal generator 51 is electrically connected to the computing element 52 and the time constant element 53, such that the time constant element 53 may measure the time constant of the signal generator 51. The computing element 52 is further electrically connected to the time constant element 53. The piezoelectric sensing element 511, the ADC 513 and the filter 514 of the signal generator 51 of the fifth embodiment may be the same as the piezoelectric sensing element, the ADC and the filter of the second to the fourth embodiments, their detail descriptions are not repeated herein.

Notably, the time constant element 53 shown in FIG. 7, includes a first switch SW1 and the microcontroller 531. The first switch SW1 and the microcontroller 531 are disposed on the same fourth circuit board PCB4, wherein the fourth circuit board PCB4 may include a printed circuit board, a substrate or an IC substrate. The reading circuit 512 of the signal generator 51 further includes a second switch SW2. The first switch SW1 and the second switch SW2 are electrically connected to the piezoelectric sensing element 511, respectively. When the first switch SW1 is closed (ON) and the second switch is open (OFF), a voltage source V may be used to input a control voltage into the piezoelectric sensing element 511 to charge the piezoelectric sensing element 511, wherein another voltage is output from the piezoelectric sensing element 511 to discharge the piezoelectric sensing element 511 to trigger the signal generator 51 to generate the increasing signal values. In other words, the generation of the increasing signal values is triggered by the control voltage input into the piezoelectric sensing element 511. Then, the first switch SW1 is open (OFF) and the second switch SW2 is closed (ON) to discharge the piezoelectric sensing element 511 and the reading circuit 512 and to trigger the signal generator 51 to generate the decreasing signal values. The microcontroller 531 may obtain the time constant according to the increasing signal values, the decreasing signal values, the time points and the measuring procedure described above. In the present embodiment, the time constant element 53 controls the open status of the first switch SW1 and the second switch SW2 to control the voltage which may trigger the signal generator 51 to generate the signal values. In the present embodiment, the time constant element 53 with the first switch SW1, the signal generator 51 and the computing element 52 may be integrated into one device. Accordingly, the time constant element 53 may use the microcontroller 531 to control the first switch SW1 and the second switch SW2 to update the time constant continuously and instantly, so that the computing element 52 may calculate the correct reconstruction value instantly.

Disclosed in this disclosure, the computing element 52 of the electric signal reconstruction system A5 may include an integrator 521, a multiplier 522 and an adder 523, wherein the integrator 521 is electrically connected to the filter 514 and the microcontroller 531 of the time constant element 53 to obtain the time constant. In another embodiment, the integrator 521 is electrically connected to the filter 514, and the multiplier 522 is electrically connected to the microcontroller 531 of the time constant element 53 (not shown in the drawings) to obtain the time constant. The microcontroller 531 sets the reciprocal of the time constant $$\left(\frac{1}{\tau}\right)$$

as the correction constant ($\kappa$) (step S501). The integrator 521 may perform the integral calculation described above according to the time points ($t_1, t_2, t_3 \ldots, t_n$) and the signal values ($f(t_1), f(t_2), f(t_3) \ldots, f(t_n)$) to generate the integral value (step S303). The integral value may be set as the fundamental value ($C(t_n)$). The multiplier may calculate a product of the correction constant ($\kappa$) and the fundamental value ($C(t_n)$) as the correction value ($V_c(t_n)$) (steps S305 and S505). The adder may calculate a sum of the designated value ($f(t_n)$) and the correction value ($V_c(t_n)$) as the reconstruction value ($V_r(t_n)$) (step S701).

Just as described in an implementation, the integrator 521, the multiplier 522 and the adder 523 of the computing element 52 may be implemented using one microprocessor or an integration of a plurality of microprocessors. In another implementation, the computing element 52 may also be one central processing unit (CPU), one microcontroller (MCU), one microprocessor (MPU), an integration of a plurality of microprocessors or a computing circuit. The integrator 521, the multiplier 522 and the adder 523 may be software modules (for example, a software application) executed by the computing element 52 (computing circuit), respectively.

Additionally, in the implementation where the computing element 52 is a central processing unit or a microprocessor, the integrator 521, the multiplier 522 and the adder 523 are software modules executed by the computing element 52, respectively. The electric signal reconstruction system A5 may further include an application specific integrated circuit (ASIC) chip, wherein the ASIC chip and the piezoelectric sensing element 511 are disposed on the same circuit board (for example, the first circuit board PCB1 shown in FIG. 4), wherein the reading circuit 512, the ADC 513, the filter 514 and the computing element 52 may be disposed in the ASIC chip. In the implementation where the computing element 52 is the microcontroller, the microcontroller and the piezoelectric sensing element 511 are disposed on the same first circuit board PCB1 (for example, the first circuit board PCB1 shown in FIG. 4).

Noticeably, the computing element 52 may also be electrically connected to the storage element 54 and the storage element 54 may be electrically connected to the display screen 55. Accordingly, the storage element 54 may store a plurality of the reconstruction values at a plurality of time points provided by the computing element 52. Therefore, the storage element 54 may store the reconstructed signal waveform. The display screen 55 may read and display the reconstruction value and the reconstructed signal waveform stored by the storage element 54.

Figure 8:
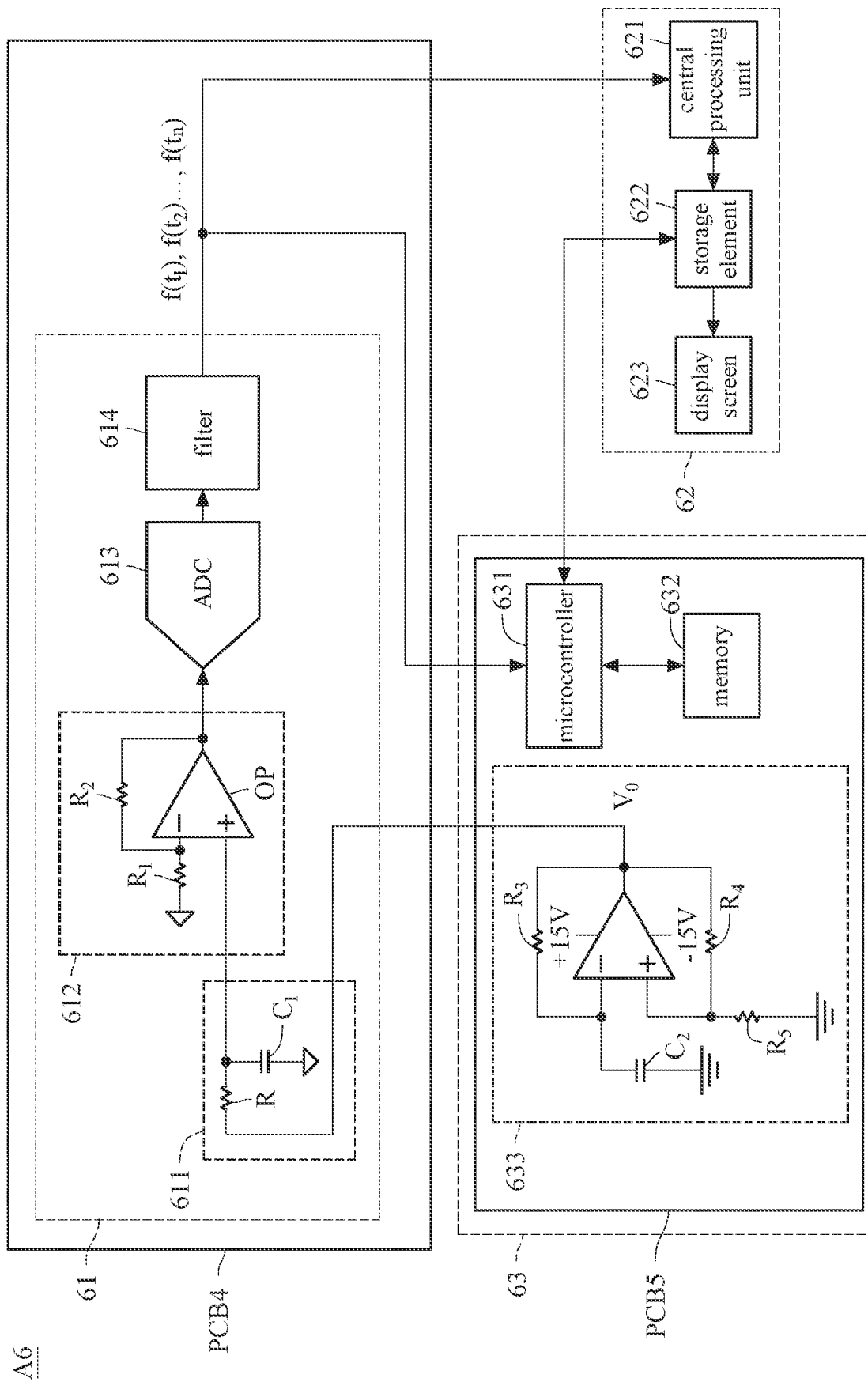
FIG. 8 is a schematic diagram illustrating an electric signal reconstruction system according to a sixth embodiment of the present disclosure.

Electric signal reconstruction system according to a sixth embodiment of the present disclosure is illustrated as a schematic diagram in FIG. 8. The electric signal reconstruction system A6 according to the sixth embodiment of the present disclosure includes the signal generator 61, the computing element 62 and the time constant element 63. The signal generator 61 is electrically connected to the computing element 62 and the time constant element 63 respectively. The computing element 62 is electrically connected to the time constant element 63. The signal generator 61 may be disposed on the fourth circuit board PCB4 and the time constant element 63 may be disposed on a fifth circuit board PCB5, wherein the fourth circuit board PCB4 and the fifth circuit board PCB5 may include a printed circuit board, a substrate or an IC substrate respectively. The computing element 62 of the sixth embodiment may be the same as the computing element 42 of the fourth embodiment, the detail description of the computing element 62 of the sixth embodiment is not repeated herein.

Particularly, the signal generator 61 of the sixth embodiment includes a resistor-capacitor circuit (RC circuit) 611, the reading circuit 612, the ADC 613 and the filter 614. As shown in FIG. 8, the RC circuit 611 includes a resistor R and a first capacitor $C_1$ which are connected in series. The signal generator 61 including the resistor-capacitor circuit 611 is configured to generate a plurality of signal values (voltage values). The signal values are a plurality of the discharging-type signal values or a plurality of the charging-type signal values. The ADC 613 is electrically connected to the resistor-capacitor circuit 611 and is electrically connected to the filter 614, wherein the ADC 613 and the filter 614 may be the same as the ADC and the filter used in the second to the fifth embodiment.

In FIG. 8, the reading circuit 612 may include the inverting closed loop amplifier formed of a first resistor $R_1$, a second resistor $R_2$ and the operational amplifier OP. The non-inverting input terminal of the operational amplifier OP is electrically connected to the RC circuit 611, and the output terminal of the operational amplifier OP is electrically connected to the ADC 613. After reading the output signal of the operational amplifier OP, the reading circuit 612 generates and outputs the analog signal. The analog signal is converted to the digital signal through the ADC 613, and the filter 614 filters the digital signal to generate the signal values $f(t_1)$, $f(t_2)$ ... $f(t_{n-1})$ and $f(t_n)$.

Figure 10:
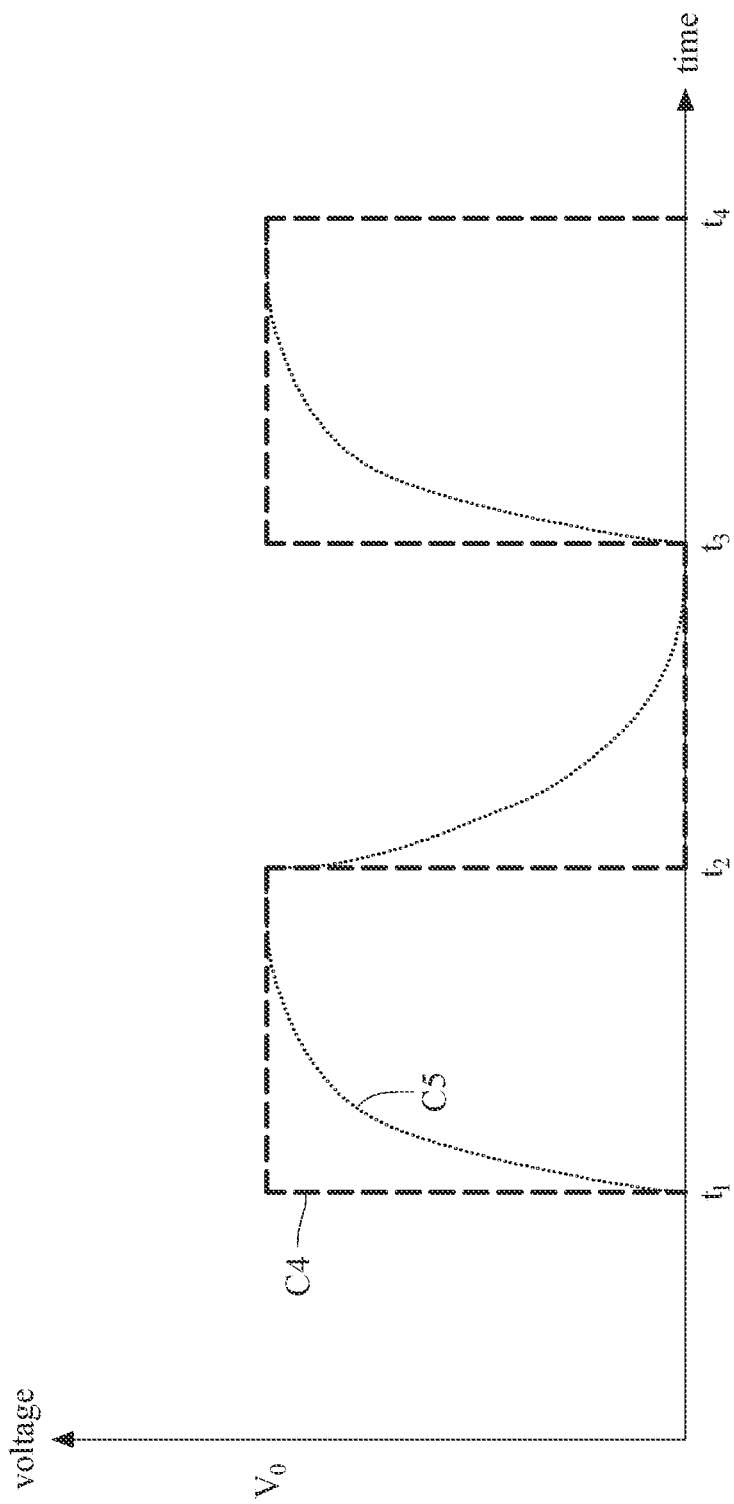
FIG. 10 illustrates an input voltage, a charging-type signal and a discharging-type signal of a resistor-capacitor circuit.

Generally, the time constant element 63 may include the microcontroller 631, the memory 632 and a square wave generator 633, wherein method of implementing the microcontroller 631 and the memory 632 are the same as the microcontroller and the memory of the fourth embodiment and/or the fifth embodiment, their detail descriptions are not repeated herein. The square wave generator 633 includes a third resistor $R_3$, a fourth resistor $R_4$, a fifth resistor $R_5$ and a second capacitor $C_2$. The third resistor $R_3$ is electrically connected to a voltage output terminal $V_0$ and an input terminal of the amplifier of the square wave generator 633, and the third resistor $R_3$ is electrically connected to the second capacitor $C_2$. The fourth resistor $R_4$ is electrically connected to the voltage output terminal $V_0$ and another input terminal of the amplifier of the square wave generator 633, and the fourth resistor $R_4$ is electrically connected to the fifth resistor $R_5$. The voltage output terminal $V_0$ of the square wave generator 633 is electrically connected to the resistor R of the RC circuit 611 of the signal generator 61 in order to input a square wave voltage signal into the signal generator 61 (as the thick dashed line C4 shown in FIG. 10). The square wave voltage signal triggers the signal generator 61 to generate the signal values (as the thin dashed line C5 shown in FIG. 10). The signal values may be categorized into the increasing signal values (the charging-type signal values (voltage value) from time point $t_1$ to time point $t_2$ as shown in FIG. 10) and the decreasing signal values (the discharging-type signal values (voltage value) from time point $t_2$ to time point $t_3$ as shown in FIG. 10). The microcontroller 631 calculates the time constant according to the increasing signal values, the decreasing signal values, the time points and the measuring procedure described above. In the present embodiment, the square wave generator 633 of the time constant element 63 triggers the signal generator 61 to generate the signal values for the computing element 62 to calculate the time constant.

According to the above description, the central processing unit 621 of the computing element 62 may perform steps S1, S3, S5 and S7 of FIG. 2 as described above and/or steps S301, S303 (or S307), S305 (or S309), S501 (or S503), S505 and S701 of FIG. 3 as described above to calculate the reconstruction value.

Regarding the computing element, it may also be implemented by the microcontroller and it may be connected to the storage element and the display screen of a personal computer, a laptop, an industrial computer or a tablet. Therefore, the reconstruction values are outputted to the storage element for storage and the reconstruction value and the voltage waveform reconstructed by the reconstruction value are displayed on the display screen.

Figure 9B:
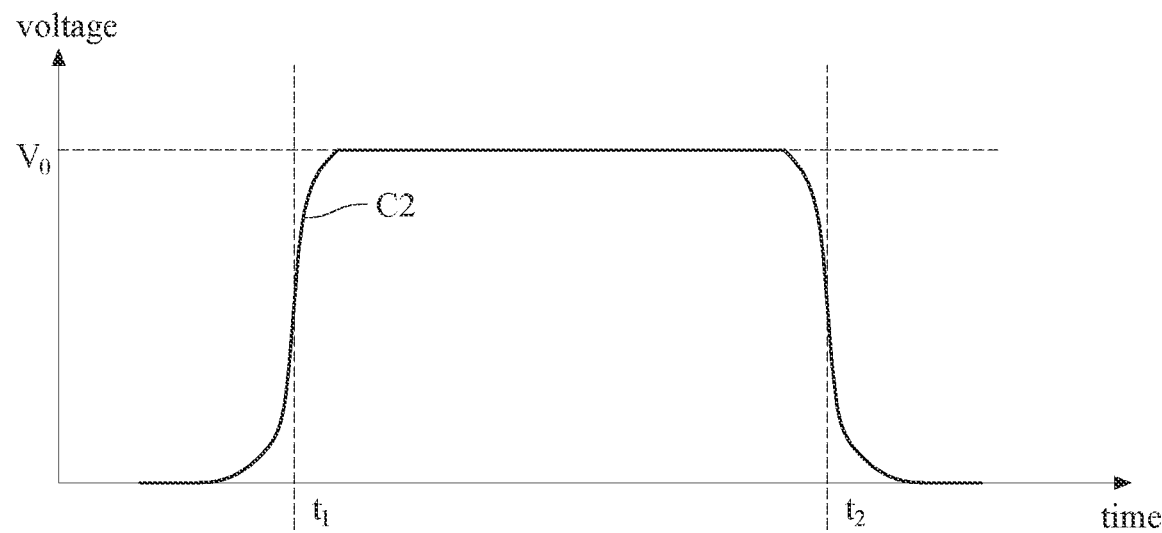
FIG. 9B illustrates a reconstructed voltage waveform of the piezoelectric force sensor after reconstructed with a reconstruction value.
Figure 9C:
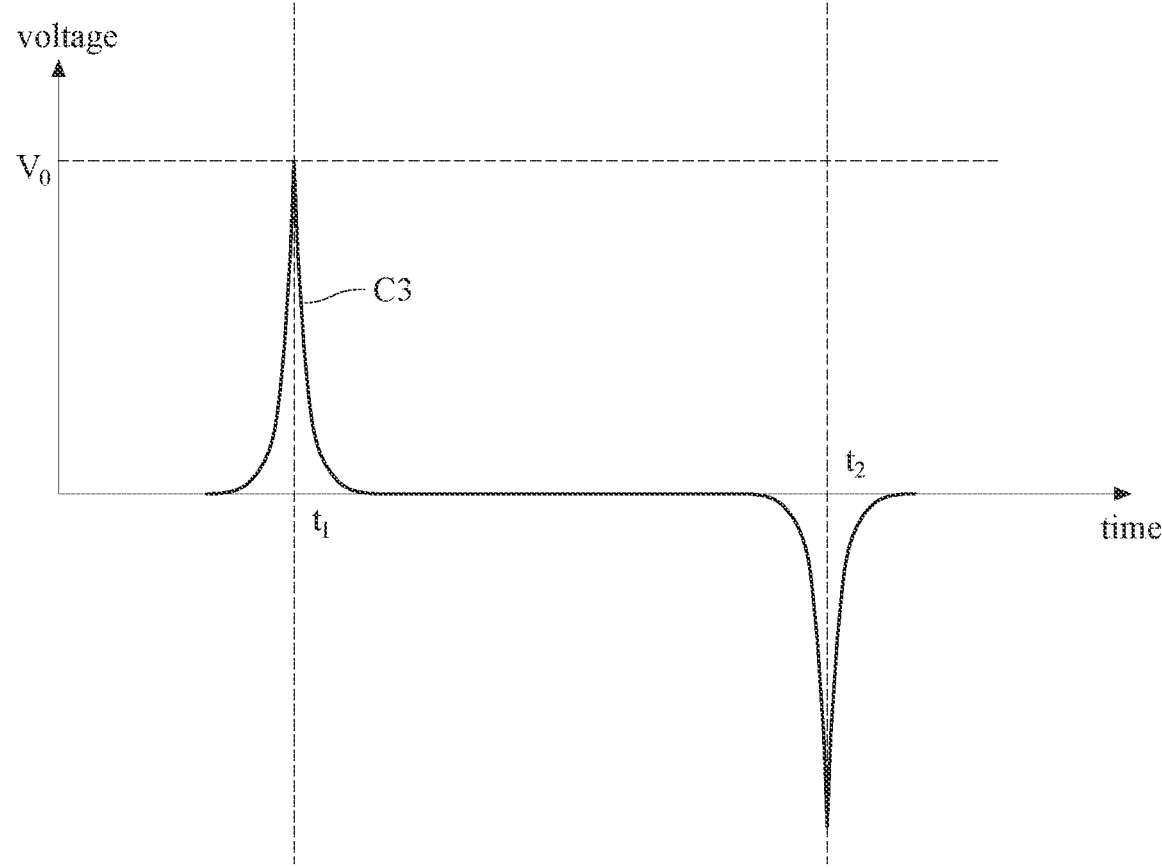
FIG. 9C illustrates a waveform of an output voltage of the piezoelectric force sensor.

Explaining an input force applied on a piezoelectric force sensor (the piezoelectric sensing element 211 shown in FIG. 4), FIG. 9A illustrates a waveform of an input force (the curve C1 as shown in FIG. 9A) with a horizontal axis representing time in millisecond (ms) and a vertical axis representing force in kilogram weight (Kgw). FIG. 9C illustrates a waveform of a plurality of signal values (voltage value) outputted by the piezoelectric force sensor. FIG. 9B illustrates a reconstructed voltage waveform using the reconstruction value. In FIG. 9C, the curve C3 represents a waveform of a plurality of signal values outputted by the force sensor. In FIG. 9B, the curve C2 represents the reconstructed voltage waveform using a plurality of the reconstruction values. As shown in FIG. 9A, in the time period from time point $t_1$ to time point $t_2$, the waveform of the force input into the piezoelectric force sensor is horizontal, which means that it is at a stage of applying an uniform input force without an increase in magnitude. As shown in FIG. 9C, the waveform of the signal values of the force sensor (the curve C3 as shown in FIG. 9C) is clearly different from the waveform of the force of FIG. 9A (the curve C1 as shown in FIG. 9A). However, the waveform of the voltage (the curve C2 as shown in FIG. 9B) reconstructed with the reconstruction value according to one or more embodiments of the present disclosure may be similar to or even the same as the waveform of the input force (the curve C1 as shown in FIG. 9A).

Clearly shown in FIG. 10, it illustrates input voltages (second physical quantity) and output voltages (signal value) of a resistor-capacitor circuit (for example, the resistor-capacitor circuit 611 of the signal generator 61 shown in FIG. 8). In FIG. 10, the thick dashed line C4 presents the input voltages of the resistor-capacitor circuit, which are voltages with square waveform. The thin dashed line C5 presents the output voltages of the resistor-capacitor circuit. In other words, the thick dashed line C4 shown in FIG. 10 may represent the input voltages of the signal generator 61 of FIG. 8, and the thin dashed line C5 may represent the signal values generated by the signal generator 61 of FIG. 8. As shown in FIG. 10, the input voltages with square waveform include a first horizontal section from time point $t_1$ to time point $t_2$ and a second horizontal section from time point $t_2$ to time point $t_3$. As shown by the thin dashed line C5 corresponding to the first horizontal section, the output voltages (signal values) measured by the resistor-capacitor circuit during charging are the charging-type signals that gradually increase. As shown by the thin dashed line C5 corresponding to the second horizontal section, the output voltages (signal values) measured by the resistor-capacitor circuit during discharging are the discharging-type signals that gradually decrease.

Figure 11:
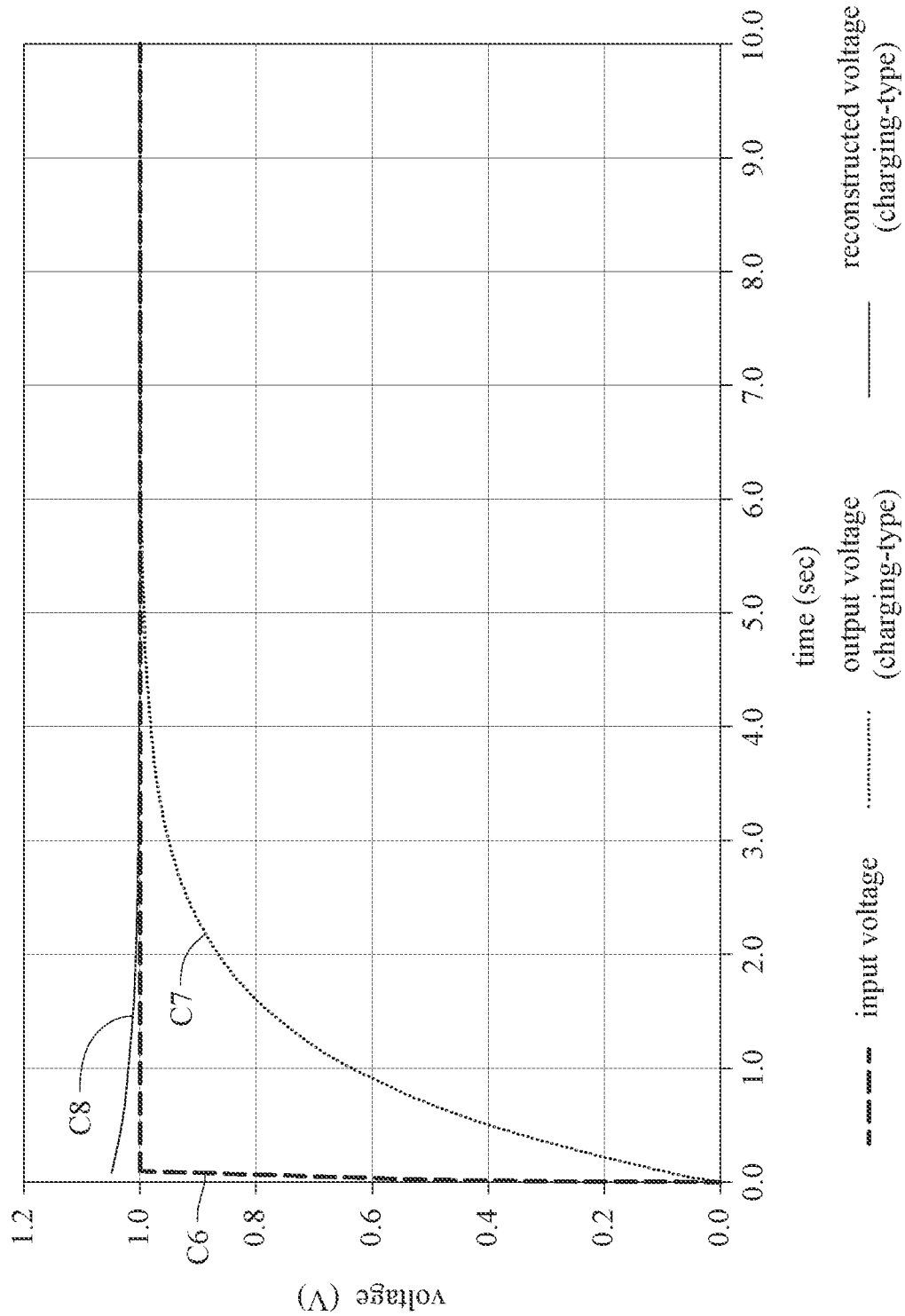
FIG. 11 shows in the example of the charging-type signal, the input voltage input to the resistor-capacitor circuit being a step function waveform, the output voltage waveform of the resistor-capacitor circuit and the reconstructed voltage waveform reconstructed by the reconstruction value.

Under the stage of the resistor-capacitor circuit generating the charging-type signals (corresponding to the time period from time point $t_1$ to time point $t_2$ shown in FIG. 10), the waveform of the input voltages of the resistor-capacitor circuit is represented by the thick dashed line C6 shown in FIG. 11, the waveform of the output voltage (the signal value) of the resistor-capacitor circuit is represented by the thin dashed line C7 shown in FIG. 11 and the reconstruction waveform (reconstructed signal) of the output voltage is represented by the solid line C8 shown in FIG. 11. The reconstruction waveform (the solid line C8) is reconstructed by the reconstruction values. In the present embodiment, the waveform of the input voltages of the resistor-capacitor circuit (thick dashed line C6) is a constant waveform with a voltage value of 1.0 $V_0$ between time point $t_1$ and time point $t_2$ shown in FIG. 10.

The input voltage (thick dashed line C6 in FIG. 11) is a step function. The waveform of the output voltage (thin dashed line C7 in FIG. 11) shows a gradually increasing curve and may be presented with equation (9) below:

$$f_{ch}(t) = V_0 \times (1 - e^{-at}) = V_0 \times \left(1 - e^{\frac{-t}{\tau}}\right) \quad (9)$$

wherein $V_0$ is the input voltage, $\tau$ is the time constant, and in this example, $\tau=1$ and $V_0=1$.

Exhibited in FIG. 11, the reconstruction waveform (the solid line C8) reconstructed by the reconstruction value) shares high similarity with the waveform of the input voltages (the horizontal section of the thick dashed line C6). The reconstruction value used for reconstructing the reconstruction waveform (reconstructed signal) may be obtained through mathematical equation (10) or equation (11) below:

$$f^*(t_n) = f(t_n) + \tau \times f'(t_n) \quad (10)$$

$$f^*(t_n) = f(t_n) + \tau \times \frac{[f(t_n) - f(t_{n-1})]}{t_n - t_{n-1}} \quad (11)$$

Let $f^*(t_n)$ denote the reconstruction value at the designated time point $t_n$, $f(t_n)$ denote the signal value at the designated time point $t_n$, $f(t_{n-1})$ denote the signal value at the designated time point $t_{n-1}$, and let $f'(t_n)$ represent the differential value of the signal value $f(t_n)$ at the designated time point $t_n$, and $\tau$ represent the time constant.

In general, the method of using equation (11) to calculate the reconstruction value may also be adapted to steps S307, S309, S503, S505 and S701 shown in FIG. 3. For example, the value of $$\frac{[f(t_n) - f(t_{n-1})]}{t_n - t_{n-1}}$$

calculated from equation (11) is the differential value $f'(t_n)$ at the designated time point $(t_n)$ in step S307 and is the fundamental value $(C(t_n))$ set in step S309. The value of $$\tau \times \frac{[f(t_n) - f(t_{n-1})]}{t_n - t_{n-1}}$$

calculated from equation (11) is the correction value $(V_c(t_n))$ in step S505. In addition, the value of $f^*(t_n)$ calculated from equation (11) is the reconstruction value $(V_r(t_n))$ at the designated time point $(t_n)$ in step S701.

Figure 12:
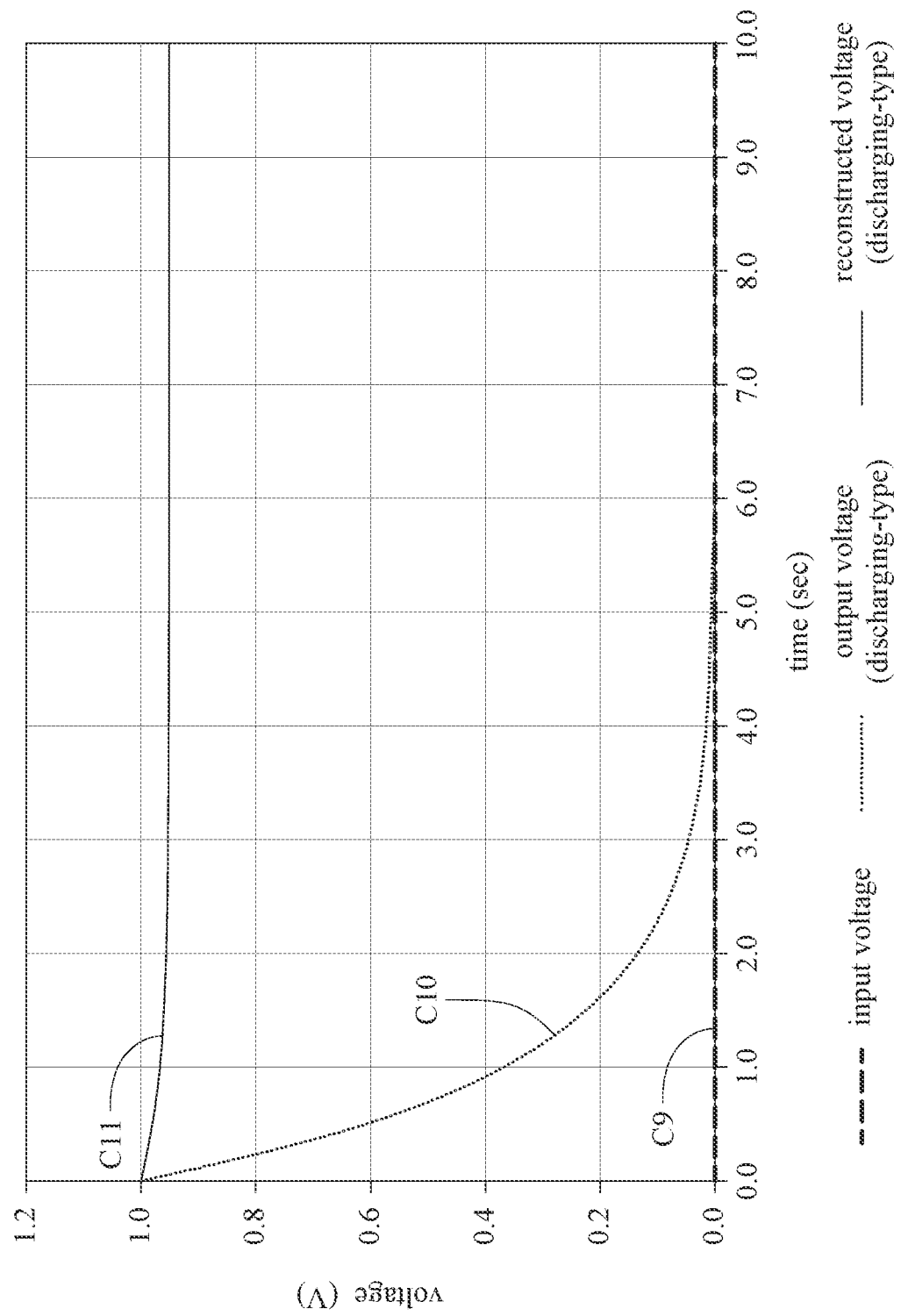
FIG. 12 shows that in the example of the discharging-type signal, the input voltage input to the resistor-capacitor circuit being a step function waveform, the output voltage waveform of the resistor-capacitor circuit and the reconstructed voltage waveform reconstructed by the reconstruction value.

Next, please refer to FIG. 12. Under the stage of the resistor-capacitor circuit (for example, the resistor-capacitor circuit 611 in the signal generator 61 shown in FIG. 8) generating the discharging-type signals (from time point $t_2$ to time point $t_3$ in FIG. 10), the input voltage input into the resistor-capacitor circuit, the output voltage of the resistor-capacitor circuit and the reconstruction waveform of the output voltage are shown in FIG. 12. The input voltage of the resistor-capacitor circuit may be regarded as the second physical quantity and be represented by the thick dashed line C9 in FIG. 12. The output voltage of the resistor-capacitor circuit includes the signal values and is represented by the thin dashed line C10 shown in FIG. 12. The reconstruction waveform is formed by the reconstructed signals and is presented by the solid line C11 shown in FIG. 12 where the voltage value approaches to 1.0 $V_0$. The reconstruction waveform is formed by the reconstruction values. In the present embodiment, the waveform of the input voltages of the resistor-capacitor circuit is a constant waveform (the thick dashed line C9) with a voltage value of 0.0 $V_0$ between time point $t_2$ and time point $t_3$ shown in FIG. 10. It should be noted that, the waveform of the reconstructed signals (solid line C11) obtained at the stage of generating the discharging-type signal may be regarded as the voltage waveform in the capacitor of the resistor-capacitor circuit when the resistor-capacitor circuit is under the condition that a constant voltage with the voltage value 1.0 is input into the resistor-capacitor circuit and the resistor-capacitor circuit does not have discharging effect and keep a constant voltage with the voltage value 1.0 in the capacitor of the resistor-capacitor circuit.

Essentially, the input voltage value of the resistor-capacitor circuit during discharging may be obtained by subtracting the reconstructed voltage value during the discharging of the resistor-capacitor circuit from the initial voltage value during the initial discharge of the resistor-capacitor circuit. In this example, the input voltage input into the resistor-capacitor circuit is a constant waveform (the thick dashed line C9 in FIG. 12) with a voltage value of 0.0 $V_0$. The waveform of the output voltage of the resistor-capacitor circuit is a waveform with exponential decay (i.e. corresponding to the thin dashed line C5 of the second horizontal section from time point $t_2$ to time point $t_3$ in FIG. 10 or thin dashed line C10 shown in FIG. 12). This output voltage of the resistor-capacitor circuit may be represented by equation (12) below:

$$f_{dis}(t) = V_0 \times e^{\frac{-t}{\tau}} \tag{12}$$

wherein $V_0$ is a value of the input voltage, $\tau$ is the time constant, and in the example of FIG. 12, $\tau=1$, $V_0=1$.

Shown in FIG. 12, the voltage waveform reconstructed by the reconstruction value (the solid line C11) may be regarded as the waveform in the capacitor with constant voltage value 1.0 when the resistor-capacitor circuit does not have the discharging effect. In addition, by subtracting the reconstructed voltage value (the solid line C11) during the discharging of the resistor-capacitor circuit from the initial output voltage value (1.0) during the initial discharge of the resistor-capacitor circuit, a waveform (not shown in FIG. 12) sharing high similarity with the waveform of the input voltage (thick dashed line C9) may be obtained. The reconstruction value for reconstructing the voltage waveform may be obtained through mathematical equation (13) or equation (14) below:

$$f^*(t_n) = f(t_n) + \frac{1}{\tau} \times \int_0^{t_n} f(x)dx \tag{13}$$

$$f^*(t_n) = f(t_n) + \frac{1}{\tau} \times \sum_{n=1}^{n=t_n} f(t_n) \times (t_n - t_{n-1}) \tag{14}$$

wherein $f^*(t_n)$ denotes the reconstruction value at the designated time point $t_n$, $f(t_n)$ denotes the designated value at the designated time point $t_n$ (i.e. output voltage at the designated time point $t_n$), and $1/\tau$ is the reciprocal of the time constant of the resistor-capacitor circuit.

The method of using equation (14) to calculate the reconstruction value may also be adapted to steps S303, S305, S501, S505 and S701 shown in FIG. 3. For example, the value of $$\sum_{n=1}^{n=t_n} f(t_n) \times (t_n - t_{n-1})$$

calculated from equation (14) is the integral value of the signal values in step S303 at the designated time point ($t_n$) and is the fundamental value ($C(t_n)$) set in step S305. The value of $$\frac{1}{\tau} \times \sum_{n=1}^{n=t_n} f(t_n) \times (t_n - t_{n-1})$$

calculated from equation (14) is the correction value ($V_c(t_n)$) in step S505. In addition, the value ($f^*(t_n)$) calculated from equation (14) is the reconstruction value ($V_r(t_n)$) at the designated time point ($t_n$) in step S701.

In one embodiment, when using equation (13) or equation (14) to calculate the reconstruction value $f^*(t_n)$, Laplace Transform may be used to transform the time domain function $f_{dis}(t)$ in equation (12) into a S-domain function $F(s)$. Then, in the S-domain, the S-domain function $F(s)$ may be multiplied with $$\left(s + \frac{1}{\tau}\right) \cdot \left(\frac{1}{s}\right)$$

to obtain another S-domain function $$F^*(s) = \left(s + \frac{1}{\tau}\right) \cdot \left(\frac{1}{s}\right) F(s),$$

wherein $\tau$ is the time constant. By performing Inverse Laplace Transform on the S-domain function $F^*(s)$, another time domain function as equation (15) below may be obtained.

$$f^*_{dis}(t) = f(t) + \frac{1}{\tau} \times \int_0^t f(x)dx \tag{15}$$

Consequently, the reconstruction value ($f^*_{dis}(t_n)$) at the designated time point $t_n$ may be calculated by using the time points ($t_1, t_2, t_3 \ldots, t_n$), the signal values ($f(t_1), f(t_2), f(t_3) \ldots, f(t_n)$) and equation (15), wherein the reconstruction value ($f^*_{dis}(t_n)$) calculated by equation (15) is substantially equal to the reconstruction value ($f^*(t_n)$) calculated by equation (14). Therefore, by using a package software (for example, MATLAB) having functions of Laplace Transform and Inverse Laplace Transform, the reconstruction values of the discharging-type output signals may be easily calculated.

Figure 13:
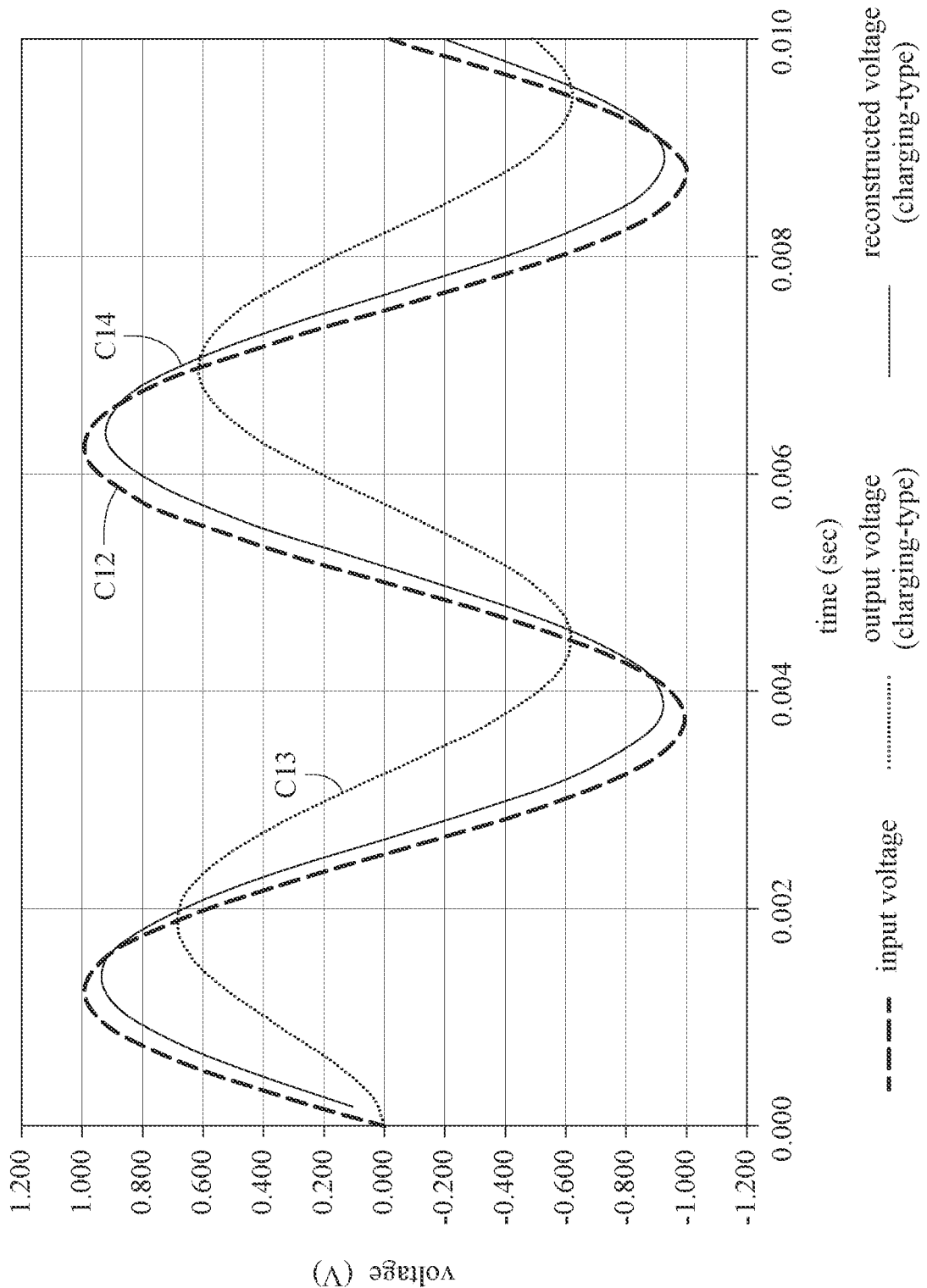
FIG. 13 shows the input voltage input to the resistor-capacitor circuit being a sine wave waveform, the output voltage waveform of the resistor-capacitor circuit and the reconstructed voltage waveform reconstructed by the reconstruction value.

Known as FIG. 13, the waveform of the input voltage (the second physical quantity) inputted into the resistor-capacitor circuit (for example, the resistor-capacitor circuit 611 in the signal generator 61 shown in FIG. 8), the waveform of the output voltage (signal value) of the resistor-capacitor circuit and the reconstructed voltage waveform with the reconstruction value are illustrated in FIG. 13, wherein the waveform of the input voltage inputted into the resistor-capacitor circuit takes the form of a sine wave.

Evidently, the thick dashed line C12 shown in FIG. 13 is the waveform of the input voltage inputted into the resistor-capacitor circuit (input voltage waveform), and the waveform of the input voltage takes the form of a sine wave. The thin dashed line C13 is the waveform of the output voltage of the resistor-capacitor circuit (output voltage waveform), and the waveform of the output voltage is a charging-type signal waveform. The solid line C14 is the reconstructed voltage waveform of the resistor-capacitor circuit.

Referring to this example in FIG. 13, the waveform of the input voltage (the thick dashed line C12) takes the form of a sine wave, and the waveform of the output voltage (the thin dashed line C13) takes the form of a stretched sine wave. As shown in FIG. 13, the waveform of the reconstructed voltage waveform (the solid line C14) with the reconstruction value and the waveform of the input voltage (the thick dashed line C12) share high similarity, wherein the reconstruction value used for the reconstructed voltage waveform may be calculated by using equation (10) or equation (11).

Stated in the above description, the electric signal reconstruction system and method according to one or more embodiments of the present disclosure may use a plurality of signal values generated by the signal generator to calculate a plurality of reconstruction values, thereby instantly calculating physical quantity (for example, force or voltage) applied to the signal generator and reconstructing the waveform of said physical quantity. Therefore, when a force is applied to the piezoelectric force sensor, according to the present disclosure, the reconstruction value may be used to instantly and accurately calculate the magnitudes of the force and reconstruct the waveform of the force. In addition, when an input voltage is applied to the resistor-capacitor circuit, according to the present disclosure, the calculated reconstruction value may be used to instantly and accurately calculate the input voltage applied to the resistor-capacitor circuit and reconstruct the waveform of the input voltage.

What is claimed is:

1. An electric signal reconstruction system, comprising:
  a signal generator having a time constant and configured to generate a plurality of signal values corresponding to a plurality of time points within a time period, wherein the plurality of signal values comprise a designated value, the plurality of time points comprise a designated time point, and the designated value corresponds to the designated time point; and
  a computing element electrically connected to the signal generator and configured to perform operations comprising:
    performing a differential calculation or an integral calculation according to the plurality of time points and the plurality of signal values to generate a fundamental value;
    calculating a correction constant associated with the time constant;
    calculating a product of the correction constant and the fundamental value as a correction value;
    calculating a sum of the correction value and the designated value as a reconstruction value; and
    outputting the reconstruction value.

2. The electric signal reconstruction system according to claim 1, wherein the computing element is configured to perform the integral calculation according to the plurality of time points and the plurality of signal values to generate an integral value as the fundamental value, the computing element is configured to calculate a reciprocal of the time constant as the correction constant.

3. The electric signal reconstruction system according to claim 2, further comprising a time constant element electrically connected to the signal generator to measure the time constant of the signal generator.

4. The electric signal reconstruction system according to claim 3, wherein the time constant element comprises a mass block and a microcontroller, and when the mass block triggers the signal generator to generate the plurality of signal values, the microcontroller is configured to calculate the time constant according to the plurality of signal values and the plurality of time points.

5. The electric signal reconstruction system according to claim 3, wherein the time constant element comprises a first switch and a microcontroller, when the first switch is electrically connected to the signal generator to control a voltage input to the signal generator, the voltage triggers the signal generator to generate the plurality of signal values, and the microcontroller is configured to calculate the time constant according to the plurality of signal values and the plurality of time points.

6. The electric signal reconstruction system according to claim 1, wherein the computing element is configured to perform the differential calculation according to the plurality of signal values and the plurality of time points to generate a differential value as the fundamental value and to set the time constant as the correction constant.

7. The electric signal reconstruction system according to claim 6, further comprising a time constant element electrically connected to the signal generator to measure the time constant of the signal generator.

8. The electric signal reconstruction system according to claim 7, wherein the time constant element comprises a square wave generator and a microcontroller, the square wave generator is electrically connected to the signal generator to input a square wave voltage signal to the signal generator, and the microcontroller is configured to calculate the time constant according to the plurality of signal values and the plurality of time points when the square wave voltage signal triggers the signal generator to generate the plurality of signal values.

9. The electric signal reconstruction system according to claim 1, adapted to a piezoelectric force sensor, further comprising:
  a first circuit board;
  wherein the signal generator comprising:
    a piezoelectric sensing element disposed on the first circuit board and configured to sense force;
    a reading circuit electrically connected to the piezoelectric sensing element;
    an analog-to-digital converter electrically connected to the reading circuit; and
    a filter electrically connected to the analog-to-digital converter;
  wherein the force triggers the signal generator to generate the plurality of signal values; and
  wherein the computing element is electrically connected to the filter, the fundamental value is generated by the computing element performing the integral calculation, and the correction constant is set as a reciprocal of the time constant by the computing element.

10. The electric signal reconstruction system according to claim 9, further comprising a time constant element electrically connected to the filter to measure the time constant of the signal generator.

11. The electric signal reconstruction system according to claim 10, wherein the time constant element comprises a mass block and a microcontroller, the microcontroller is disposed on the mass block through a circuit board, the signal generator generates the plurality of signal values when the mass block triggers the piezoelectric sensing element of the signal generator, and the microcontroller is configured to calculate the time constant according to the plurality of signal values and the plurality of time points.

12. The electric signal reconstruction system according to claim 10, wherein the time constant element comprises a first switch and a microcontroller, the first switch and the microcontroller are disposed on another circuit board, the reading circuit comprises a second switch, wherein a voltage is input to the piezoelectric sensing element to charge the piezoelectric sensing element when the first switch is closed and the second switch is open, wherein another voltage associated with the voltage is output from the piezoelectric sensing element to discharge the piezoelectric sensing element to trigger the signal generator to generate the plurality of signal values when the first switch is open and the second switch is closed, and the microcontroller is configured to calculate the time constant according to the plurality of signal values and the plurality of time points.

13. The electric signal reconstruction system according to claim 9, wherein the reading circuit is disposed on the first circuit board, the analog-to-digital converter and the filter are disposed on a second circuit board, the computing element is a central processing unit or a microprocessor.

14. The electric signal reconstruction system according to claim 9, further comprising an application specific integrated circuit chip, wherein the application specific integrated circuit chip is disposed on the first circuit board and the reading circuit, the analog-to-digital converter and the filter are disposed in the application specific integrated circuit chip.

15. The electric signal reconstruction system according to claim 14, wherein the computing element is a microcontroller and the microcontroller is disposed on the first circuit board.

16. The electric signal reconstruction system according to claim 9, further comprising an application specific integrated circuit chip, wherein the application specific integrated circuit chip is disposed on the first circuit board, the reading circuit and the analog-to-digital converter, the filter and the computing element are disposed in the application specific integrated circuit chip, the computing element is a computing circuit which comprises an integrator, a multiplier and an adder, the integrator is configured to perform the integral calculation according to the plurality of time points and the plurality of signal values to generate the integral value, the multiplier is configured to calculate the product, the adder is configured to calculate the sum.

17. An electric signal reconstruction method, implemented with the electric signal reconstruction system of claim 1, comprising:
generating the plurality of signal values, by the signal generator, corresponding to a plurality of time points within the time period, wherein the signal generator has the time constant, and the plurality of signal values comprises the designated value, the plurality of time points comprises the designated time point, the designated value corresponds to the designated time point;
performing, by the computing element, the integral calculation or the differential calculation according to the designated time point and the plurality of signal values to generate the fundamental value;
calculating, by the computing element, the correction constant associated with the time constant and calculating the product of the correction constant and the fundamental value as the correction value; and
calculating, by the computing element, the sum of the correction value and the designated value as the reconstruction value, and
outputting, by the computing element, the reconstruction value.

18. The electric signal reconstruction method according to claim 17, wherein performing the integral calculation or the differential calculation according to the designated time point and the plurality of signal values to generate the fundamental value comprises:
performing the integral calculation according to the designated time point and the plurality of signal values to generate an integral value as the fundamental value, wherein the correction constant is a reciprocal of the time constant.

19. The electric signal reconstruction method according to claim 17, wherein performing the integral calculation or the differential calculation according to the designated time point and the plurality of signal values to generate the fundamental value comprises:
performing the differential calculation according to the designated time point and the plurality of signal values to generate a differential value as the fundamental value, wherein the correction constant is the time constant.

20. The electric signal reconstruction method according to claim 17, wherein performing the integral calculation or the differential calculation according to the designated time point and the plurality of signal values to generate the fundamental value comprises:
determining whether the plurality of signal values are a plurality of discharging-type signal values or a plurality of charging-type signal values;
performing the integral calculation according to the designated time point and the plurality of signal values to generate an integral value as the fundamental value when the plurality of signal values are the plurality of discharging-type signal values, wherein the correction constant is a reciprocal of the time constant; and
performing the differential calculation according to the designated time point and the plurality of signal values to generate a differential value as the fundamental value when the plurality of signal values are the plurality of charging-type signal values, wherein the correction constant is the time constant.

21. The electric signal reconstruction method according to claim 17, further comprising:
performing an analog-to-digital conversion procedure and a filtering procedure on an original electric signal by an analog-to-digital converter and a filter to generate the plurality of signal values.

22. The electric signal reconstruction method according to claim 17, wherein obtaining the plurality of signal values comprises:
generating the plurality of signal values by a piezoelectric sensing element that senses an applied force.

23. An electric signal reconstruction system, comprising:
a signal generator having a time constant and configured to generate a plurality of signal values corresponding to a plurality of time points within a time period, wherein the plurality of signal values comprise a designated value, the plurality of time points comprise a designated time point, and the designated value corresponds to the designated time point; and
a computing element electrically connected to the signal generator and configured to perform operations comprising:
performing a differential calculation and an integral calculation according to the plurality of time points and the plurality of signal values to generate a fundamental value;
calculating a correction constant associated with the time constant;

calculating a product of the correction constant and the fundamental value as a correction value;

calculating a sum of the correction value and the designated value as a reconstruction value; and outputting the reconstruction value.

24. The electric signal reconstruction system according to claim 23, further comprising a time constant element electrically connected to the signal generator to measure the time constant of the signal generator.

25. The electric signal reconstruction system according to claim 24, wherein the time constant element comprises a square wave generator and a microcontroller, the square wave generator is electrically connected to the signal generator to input a square wave voltage signal to the signal generator, and the microcontroller is configured to calculate the time constant according to the plurality of signal values and the plurality of time points when the square wave voltage signal triggers the signal generator to generate the plurality of signal values.

26. The electric signal reconstruction system according to claim 25, wherein the computing element is configured to perform a determination calculation according to the plurality of signal values and the plurality of time points to determine whether the plurality of signal values are a plurality of discharging-type signal values or a plurality of charging-type signal values.

27. The electric signal reconstruction system according to claim 26, wherein the plurality of signal values are the plurality of discharging-type signal values, the computing element is configured to perform the integral calculation to generate an integral value, and the computing element sets the integral value as the fundamental value and sets a reciprocal of the time constant as the correction constant.

28. The electric signal reconstruction system according to claim 12, wherein the plurality of signal values are the plurality of charging-type signal values, the computing element is configured to perform the differential calculation to generate a differential value, the computing element sets the fundamental value as the differential value and sets the correction constant as the time constant.

29. The electric signal reconstruction system according to claim 23, wherein the signal generator comprises a resistor-capacitor circuit with a resistor and a capacitor connected in series, and the resistor-capacitor circuit is configured to generate the plurality of signal values, and the plurality of signal values comprise a plurality of discharging-type signal values or a plurality of charging-type signal values.

30. The electric signal reconstruction system according to claim 29, wherein the signal generator comprises an analog-to-digital converter and a filter, and the analog-to-digital converter is electrically connected to the resistor-capacitor circuit and the filter.

* * * * *